US012789316B2

(12) United States Patent
Sugita

(10) Patent No.: US 12,789,316 B2
(45) Date of Patent: Nov. 10, 2026

(54) PORTABLE ABRADING MACHINE

(71) Applicant: MAKITA CORPORATION, Anjo (JP)

(72) Inventor: Fumihide Sugita, Anjo (JP)

(73) Assignee: MAKITA CORPORATION, Anjo (JP)

( * ) Notice: Subject to any disclaimer, the term of this patent is extended or adjusted under 35 U.S.C. 154(b) by 614 days.

(21) Appl. No.: 18/281,331

(22) PCT Filed: Jan. 13, 2022

(86) PCT No.: PCT/JP2022/000876

§ 371 (c)(1),
(2) Date: Sep. 11, 2023

(87) PCT Pub. No.: WO2022/201759

PCT Pub. Date: Sep. 29, 2022

(65) Prior Publication Data

US 2024/0157506 A1 May 16, 2024

(30) Foreign Application Priority Data

Mar. 26, 2021 (JP) ................................ 2021-052804

(51) Int. Cl.
*B24B 47/12* (2006.01)
*B24B 1/00* (2006.01)
(Continued)

(52) U.S. Cl.
CPC .............. *B24B 47/12* (2013.01); *B24B 55/10* (2013.01); *B24B 1/002* (2013.01); *B24B 23/024* (2013.01); *B24B 47/26* (2013.01); *B25F 5/02* (2013.01)

(58) Field of Classification Search
CPC ....... B24B 23/02; B24B 23/055; B24B 55/10; B24B 55/105; B24B 55/102; B24B 55/00; B24B 47/12
(Continued)

(56) References Cited

U.S. PATENT DOCUMENTS

2001/0003087 A1 6/2001 Oda et al.
2009/0298403 A1 12/2009 Yamashiro et al.
(Continued)

FOREIGN PATENT DOCUMENTS

CN 106514468 A 3/2017
CN 111546294 A 8/2020
(Continued)

OTHER PUBLICATIONS

Machine translation of CN-113843695-A (Year: 2021).*
(Continued)

*Primary Examiner* — Robert F Neibaur
(74) *Attorney, Agent, or Firm* — J-TEK LAW PLLC; Jeffrey D. Tekanic; Scott T. Wakeman

(57) ABSTRACT

A portable abrading machine includes an abrading-machine main body, a battery holster, and a power-supply cord. The abrading-machine main body includes a main-body housing, which houses a motor, and an abrading part, which is configured to move with orbital motion when a motor shaft of the motor is rotated. The battery holster includes a battery-mounting part, on which a battery is mountable. The power-supply cord is configured to supply electric power from the battery, when mounted on the battery-mounting part, to the abrading-machine main body. The power-supply cord connects the abrading-machine main body and the battery holster without going through the housing.

26 Claims, 14 Drawing Sheets

(51) Int. Cl.

| | |
|---|---|
| ***B24B 23/02*** | (2006.01) |
| ***B24B 47/26*** | (2006.01) |
| ***B24B 55/10*** | (2006.01) |
| ***B25F 5/02*** | (2006.01) |

(58) Field of Classification Search
USPC .......................... 451/344, 357, 359, 159, 270
See application file for complete search history.

(56) References Cited

U.S. PATENT DOCUMENTS

| | | | | |
|---|---|---|---|---|
| 2010/0105287 | A1 | 4/2010 | Nordstrom | |
| 2012/0104992 | A1 | 5/2012 | Suzuki et al. | |
| 2012/0170204 | A1 | 7/2012 | Ahn et al. | |
| 2013/0165026 | A1 | 6/2013 | Sugita et al. | |
| 2014/0151079 | A1 | 6/2014 | Furui et al. | |
| 2014/0159640 | A1 | 6/2014 | Yoshikawa et al. | |
| 2014/0159662 | A1 | 6/2014 | Furui et al. | |
| 2017/0072534 | A1 | 3/2017 | Nakamura et al. | |
| 2017/0106491 | A1 | 4/2017 | Ishikawa et al. | |
| 2017/0282346 | A1* | 10/2017 | Valentini | B25F 5/00 |
| 2020/0254576 | A1 | 8/2020 | Kume et al. | |
| 2022/0126417 | A1 | 4/2022 | Ruhland | |

FOREIGN PATENT DOCUMENTS

| | | | | |
|---|---|---|---|---|
| CN | 111660180 | A | 9/2020 | |
| CN | 113843695 | A * | 12/2021 | H02J 7/751 |
| EP | 3700048 | A1 | 8/2020 | |
| JP | S62148169 | A | 7/1987 | |
| JP | H0362783 | U | 6/1991 | |
| JP | H07150760 | A | 6/1995 | |
| JP | H08336778 | A | 12/1996 | |
| JP | 2001162508 | A | 6/2001 | |
| JP | 2005246949 | A | 9/2005 | |
| JP | 2005279891 | A | 10/2005 | |
| JP | 2009166147 | A | 7/2009 | |
| JP | 2009285786 | A | 12/2009 | |
| JP | 2010522088 | A | 7/2010 | |
| JP | 2013129014 | A | 7/2013 | |
| JP | 2017104949 | A | 6/2017 | |
| JP | 2017185615 | A | 10/2017 | |
| JP | 2017202537 | A | 11/2017 | |
| WO | 2020161025 | A1 | 8/2020 | |

OTHER PUBLICATIONS

Office Action from the Chinese Patent Office dispatched on Aug. 21, 2025, in related CN application No. 202280022572.2, and translation thereof.
Office Action from the Japanese Patent Office dispatched Jan. 20, 2026 in related application No. 2024-198704, and translation thereof.
Office Action from the Japanese Patent Office dispatched on Jun. 25, 2024 in related Japanese application No. 2023-508660, and machine translation thereof.
English translation of the Written Opinion of the International Searching Authority for parent application No. PCT/JP2022/000876.
English translation of the International Search Report dated Mar. 22, 2022 for parent application No. PCT/JP2022/000876.
Office Action from the Chinese Patent Office dispatched on Apr. 30, 2026 in related application No. 202280022572.2, and translation thereof.
Office Action from the Chinese Patent Office dispatched on Jul. 16, 2026 in related CN application No. 202280022572.2, and translation thereof.

* cited by examiner

PORTABLE ABRADING MACHINE

TECHNICAL FIELD

The present disclosure generally relates to a portable abrading machine, such as an orbital sander or polisher.

BACKGROUND ART

Sanders configured to orbitally move an abrading pad are known. For example, in Japanese Laid-open Patent Publication 2013-129014 and its family member US 2013/165026, a so-called "random orbit sander" is described in which a battery-mounting part is formed on the outer surface of a housing, electric power (current) from a battery is supplied to a motor, and thereby an abrading pad moves with rotational motion and eccentric motion, i.e. orbital motion.

SUMMARY OF THE INVENTION

With regard to the sander described in Japanese Laid-open Patent Publication 2013-129014, by disposing the battery-mounting part such that the battery, which increases the weight quite a bit, is brought closer to an output shaft at the center of the sander, the weight balance of the sander is made satisfactory, and ease of operation and stability are improved. However, there is demand for a new technique, apart from the technique described in Japanese Laid-open Patent Publication 2013-129014, that is capable of improving ease of operation of a portable abrading machine configured to orbitally move an abrading pad.

The present disclosure can be implemented, e.g., as one or more of the aspects described below.

According to a first aspect of the present disclosure, a portable abrading machine comprises an abrading-machine main body, a battery holster, and a power-supply cord. The abrading-machine main body comprises a main-body housing, which houses a motor, and an abrading part, which is configured to move with orbital motion when a motor shaft of the motor is rotated. The battery holster comprises a battery-mounting part, on which a battery is mounted preferably in a detachable manner. The power-supply cord is configured to supply electric power (current) from the battery, which is mounted on the battery-mounting part, to the abrading-machine main body, preferably to the motor. The power-supply cord is configured to couple the abrading-machine main body and the battery holster without going through the housing.

According to this aspect, because the battery, which increases the weight quite a bit, is mounted on the battery-mounting part, which is provided on the battery holster (i.e. separate from the abrading-machine main body), the weight of the abrading-machine main body can be decreased. Consequently, ease of operation of the portable abrading machine can be improved. In addition, because little or no vibration generated by the orbital motion will be transmitted to the battery-mounting part, the service life of the battery-mounting part and the battery, which is mounted on the battery-mounting part, can be lengthened.

DETAILED DESCRIPTION OF THE INVENTION

Figure 1:
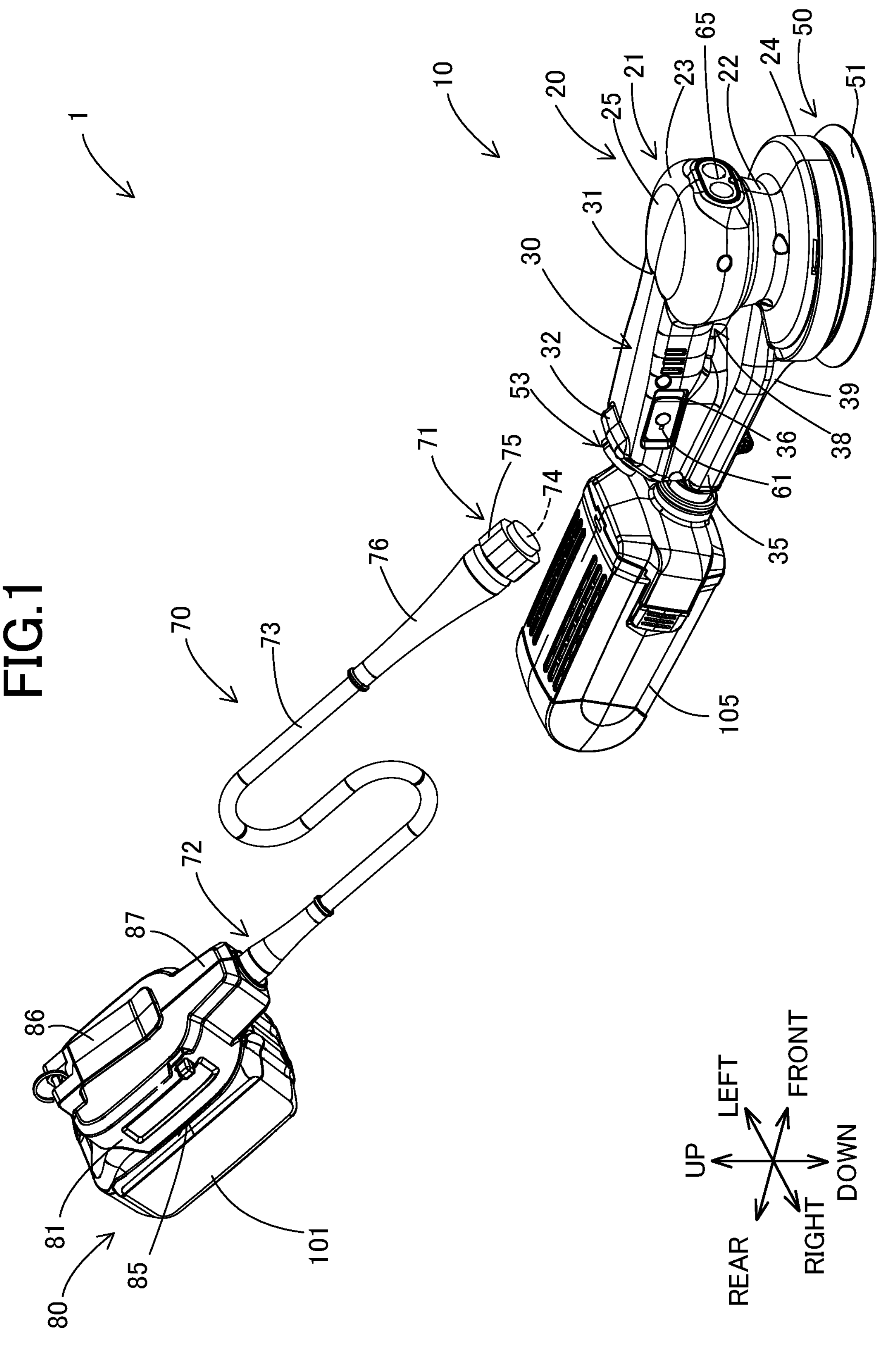
FIG. 1 is an oblique view of a sander according to a first embodiment of the present teachings.

Representative, non-limiting concrete examples of the present disclosure are explained in detail below, with reference to the drawings. This detailed explanation is intended merely to illustrate to a person skilled in the art that details to implement preferred examples of the present disclosure are not intended to limit the scope of the present disclosure. In addition, additional features and the disclosure disclosed below can be used separately from or together with other features and disclosures to provide a further improved portable abrading machine, manufacturing method, and method of use.

In addition, the combinations of features and processes disclosed in the detailed explanation below are not essential to carry out the present disclosure in the broadest meaning and are recited only to explain representative concrete examples of the present disclosure in particular. Furthermore, in providing additional and useful embodiments of the present disclosure, the various features of the representative concrete examples above and below and the various features of the independent and dependent claims do not necessarily have to be combined as indicated in the concrete examples recited herein or as indicated in the sequence enumerated herein.

All features recited in the present specification and/or in the patent claims are intended, separately from the configuration of features recited in the embodiments and/or the claims, to be disclosed individually and mutually independently as limitations relative to the specific matters disclosed in the disclosure and claims of the original patent application. Furthermore, description related to all numerical ranges, groups, and collections are intended to disclose intermediate configurations thereof as limitations relative to specific matters recited in the disclosure and the claims of the original patent application.

In one or more embodiments, the power-supply cord may comprise a first connector, which connects (or is mounted on) to the abrading-machine main body. The abrading-machine main body may comprise a second connector, which is configured to connect to the first connector and is configured to supply electric current from the battery to the motor. The first connector is preferably configured to be detachable from the second connector.

According to the above-mentioned aspect, the handling of the portable abrading machine becomes easier as compared to a configuration in which the power-supply cord is permanently connected to the abrading-machine main body in an undetachable manner. In addition, the battery holster and the power-supply cord can be used by connecting them to some other portable abrading machine having the second connector.

In one or more embodiments, a rotational axis of the motor may extend in an up-down direction, and the abrading part may be located on the lower side relative to the main-body housing. A main grip part, which has a shape that is grippable by a user, may be provided on an upper-end part of the main-body housing. When the main grip part and the motor are viewed in the up-down direction (the rotational axis direction) from upward of the main grip part, the main grip part may be disposed overlapping the motor such that an outer edge of the main grip part surrounds an outer edge of the motor (such that the outer edge of the main grip part is located more outward than the outer edge of the motor).

According to the above-mentioned aspect, the user can easily perform abrading work by gripping the main grip part and pressing the abrading-machine main body downward; vibration that arises owing to the orbital motion of the abrading part can be effectively curtailed.

In one or more embodiments, the abrading-machine main body may further comprise an auxiliary grip part, which is connected to the main grip part and extends in a direction that intersects the rotational axis.

According to the above-mentioned aspect, because the user can perform abrading work by gripping the main grip part with one hand while gripping the auxiliary grip part with the other hand and then pressing the abrading-machine main body toward to the work material, the abrading work can be stabilized.

In one or more embodiments, the abrading-machine main body may comprise a dust-collecting nozzle, which is configured to discharge dust generated by the abrading part abrading a work material. The dust-collecting nozzle may be provided downward of the auxiliary grip part in the up-down direction. When the auxiliary grip part and the dust-collecting nozzle are viewed in the up-down direction from upward of the auxiliary grip part, the dust-collecting nozzle may be disposed overlapping the auxiliary grip part.

According to the above-mentioned aspect, because the dust-collecting nozzle is disposed at a location overlapping the auxiliary grip part in the up-down direction, the abrading-machine main body can be made smaller. In addition, because the dust-collecting nozzle will not obstruct the abrading work, ease of operation of the portable abrading machine can be improved.

In one or more embodiments, the second connector may be provided on an end portion on the side, from among the extension directions of the auxiliary grip part, leading away from the main grip part.

According to the above-mentioned aspect, because the second connector is disposed at a location of the abrading-machine main body that is spaced apart from the abrading part, the second connector can inhibit the power-supply cord from obstructing abrading work. In addition, in the situation in which the auxiliary grip part is disposed on the user side, the abrading part is disposed on the side distant from the user, and the user performs abrading work while wearing the battery holster, the power-supply cord is located in the vicinity of the user's own body, and therefore it is possible to further inhibit the power-supply cord from obstructing the abrading work.

In one or more embodiments, in the state in which the extension direction of the auxiliary grip part is set to (aligned with) a front-rear direction, the side of the auxiliary grip part that connects with the main grip part is defined as the front side, and the side opposite thereof is defined as the rear side, a rear-end part of the dust-collecting nozzle may be configured to mount a dust-collection container, which is capable of storing dust, in a detachable manner. In addition, the abrading part may comprise an abrading pad, which is driven by the motor. Furthermore, the power-supply cord may be configured such that it does not make contact with the dust-collection container when the state of the portable abrading machine is a first state. The first state may be a state in which conditions (i)-(iv) are satisfied, namely: (i) The dust-collection container is mounted on the dust-collecting nozzle. (ii) The abrading pad is placed on a level surface. (iii) The battery holster and the abrading-machine main body are connected by the power-supply cord. (iv) The battery holster is disposed (preferably, directly rearward of the rear end of the dust-collection container and below the level surface but) such that the intrinsic weight of the battery holster is not applied to the power-supply cord.

According to the above-mentioned aspect, because the portable abrading machine is configured such that, when in the first state, the dust-collection container and the power-supply cord do not make contact with each other (are spaced apart), the dust-collection container and the power-supply cord are inhibited from rubbing against each other (creating friction) due to vibration generated by the orbital motion. Consequently, durability of the power-supply cord can be improved and, as a result, durability of the portable abrading machine can be improved.

In one or more embodiments, the first state further may be a state in which the battery holster satisfies additional conditions (a)-(c) below, namely: (a) The battery holster is disposed more rearward than the rear end of the dust-collection container. (b) A connecting portion of the battery holster that connects with the power-supply cord faces upward. (c) The battery holster is disposed more upward than a lower-end position of the power-supply cord when the power-supply cord is extended downward. It is noted that the extension of the power-supply cord downward is a state in which there are no bends in the power-supply cord and is also a state in which the power-supply cord has been dangled to a position that is more downward than the abrading-machine main body. The extension of the power-supply cord downward can also mean a state in which the power-supply cord is fully extended.

According to the above-mentioned aspect, the first state may include an arrangement (attitude) in which the battery holster satisfies conditions (a)-(c), and the portable abrading machine is configured such that the dust-collection container and the power-supply cord do not make contact with each other in the situation that is the first state. Consequently, the rubbing together of the dust-collection container and the power-supply cord owing to vibration generated by the orbital motion is effectively inhibited.

In one or more embodiments, the power-supply cord may comprise a cord main body and a cover. The cord main body may be configured to provide conduction between the battery, which is mounted on the battery mounting part, and the abrading-machine main body. The cover may be configured such that it extends rearward from the first connector and covers a portion of the cord main body.

According to the above-mentioned aspect, because the cover guides the cord main body in the extension direction (rearward) of the cover, the cord main body can be inhibited from making contact with the dust-collection container. Consequently, durability of the cord main body can be improved. It is noted that "covers a portion of the cord main body" may be surrounding of the outer side (outer circumference, radially outward) of the cord main body along a portion of the total length of the cord main body.

In one or more embodiments, the flexibility of the cover may be less than the flexibility of the cord main body.

According to the above-mentioned aspect, because the cover is constituted such that the flexibility of the cover is less than the flexibility of the cord main body, the cord main body can be guided in its own extension direction (rearward). Consequently, the cord main body can be further inhibited from making contact with the dust-collection container.

In one or more embodiments, in the situation in which the dust-collection container is mounted on the rear-end part of the dust-collecting nozzle, the cover may be located upward of the dust-collection container. Furthermore, the cover may be configured to overlap the dust-collection container by 30% or more in the front-rear direction.

According to the above-mentioned aspect, because the cover overlaps the dust-collection container by 30% or more and is located upward of the dust-collection container, the cord main body can be effectively inhibited from making contact with the dust-collection container while the cord main body is being guided in its own extension direction (rearward).

In one or more embodiments, the cover may be configured such that, when the portable abrading machine is in the first state, a first virtual plane, which includes (contains) the level surface, and an axis, which passes through the center (extends along the longitudinal center) of the cover, intersect each other, and the cover extends rearward and upward of the first connector.

According to the above-mentioned aspect, the cord main body can be guided rearward and upward by the cover, which extends rearward and upward. Consequently, the cord main body can be effectively inhibited from making contact with the dust-collection container.

In one or more embodiments, the cover may be configured such that, when the portable abrading machine is in the first state, a (the) first virtual plane, which includes (contains) the level surface, and a second virtual plane, which passes through (intersects) the rear end of the abrading pad and makes contact with (intersects) the lower end of the dust-collection container, is 5° or more. In addition, the cover may be configured such that the angle formed between the first virtual plane and the second virtual plane is 15° or less.

According to the above-mentioned aspect, the lower end of the dust-collection container can be inhibited from making contact with the work material even if the dust-collection container vibrates or the front end of the abrading part is lifted slightly upward during abrading work. Consequently, it is possible to curtail a decrease in durability of the abrading-machine main body, to which the dust-collection container is connected. In addition, because it is possible to inhibit damage to the work material due to the dust-collection container making contact with the work material, abrading precision can be improved.

In one or more embodiments, the power-supply cord may be configured such that, when the portable abrading machine is in the first state, an angle formed between a tangent line and the axis, which passes through the center (extends along the longitudinal center) of the cover, is 55° or more, wherein the tangent line intersects the point of intersection of the first virtual plane, which (contains) the plane level surface, and the cord main body and extends in the same direction as the curve of the portion of the cord main body at the point of intersection. In addition, the power-supply cord may be configured such that the angle formed between the tangent and the axis is 90° or less.

According to the above-mentioned aspect, by setting the angle formed between the tangent and the axis to 55° or more, the cord main body can be effectively inhibited from making contact with the dust-collection container. In addition, by setting the angle formed between the tangent and the axis to 90° or less, the cord main body bends downward rearward of the abrading-machine main body without excessively extending rearward from the abrading-machine main body, and therefore the cord main body can be inhibited from obstructing abrading work. Consequently, durability of the power-supply cord and ease of operation of the portable abrading machine can be improved.

In one or more embodiments, when the portable abrading machine is in the first state, the cord main body may intersect the first virtual plane, which includes (contains) the level surface, at a first location that is rearward of the abrading-machine main body. The first location may be a location that is forward of a second location that is rearward rear end of the abrading-machine main body by a distance equal to the length of the abrading-machine main body in the front-rear direction. In other words, the first location is located between (i) the rear end of the abrading-machine main body and (ii) a second location that is spaced apart from the rear end of the abrading-machine main body in the rearward direction by a distance equal to the length of the abrading-machine main body in the front-rear direction.

According to the above-mentioned aspect, the cord main body bends downward rearward of the abrading-machine main body without excessively extending rearward from the abrading-machine main body. Consequently, because the cord main body can be inhibited from obstructing abrading work, ease of operation of the portable abrading machine can be improved.

In one or more embodiments, the abrading-machine main body may be configured such that, in the state in which the dust-collection container is mounted on the rear-end part, the mass of the abrading-machine main body in the front-rear direction is balanced at a prescribed balance point. The balance point may be provided on/in the auxiliary grip part.

According to the above-mentioned aspect, because the mass (mass moment) of the abrading-machine main body, on which the dust-collection container is mounted, in the front-rear direction is balanced on/in the auxiliary grip part, which extends in the front-rear direction, ease of operation of the portable abrading machine can be improved.

In one or more embodiments, the abrading-machine main body may be configured such that the distance between an intermediate point of the length of the dust-collection container in the front-rear direction and the balance point is 0.150 m (meters) or more. In addition, the abrading-machine main body may be configured such that the distance between the intermediate point of the length of the dust-collection container in the front-rear direction and the balance point is 0.200 m or less.

According to the above-mentioned aspect, in the situation in which the dust-collection container is mounted on the abrading-machine main body, ease of operation of the portable abrading machine can be improved.

In one or more embodiments, the abrading-machine main body may be configured such that the distance between the rotational axis of the motor and the balance point is 0.040 m. In addition, the abrading-machine main body may be configured such that the distance between the rotational axis and the balance point is 0.100 m or less.

According to the above-mentioned aspect, the distance between the balance point and the rotational axis of the motor can be inhibited from becoming too large while the front-rear-direction length of the abrading-machine main body can be set to a length suited to the abrading work. Consequently, ease of operation of the portable abrading machine can be improved.

In one or more embodiments, the portable abrading machine may be configured such that the mass moment of a portion from the balance point to the rotational axis of the motor is 0.20 Nm (newton·meters) or more. In addition, the portable abrading machine may be configured such that the mass moment is 0.50 Nm or less.

According to the above-mentioned aspect, the mass moment of the front portion from the balance point can be inhibited from becoming too large. Consequently, it is possible to provide a portable abrading machine that is suited to carrying.

In one or more embodiments, the battery holster may comprise a hook. The hook may be configured such that the battery holster can be mounted on the user. The length of the cord main body may be 0.80 m or more. In addition, the length of the cord main body may be 2.0 m or less.

According to the above-mentioned aspect, by using the hook the user can perform abrading work by wearing the battery holster on a belt or the like. In addition, because the length of the cord main body is 0.80 m or more, even if the user extends their arm, it is possible to inhibit the cord main body from being pulled between the battery holster and the abrading-machine main body. In addition, because the length of the cord main body is 2.0 m or less, it is possible to inhibit the cord main body from obstructing the abrading work. Consequently, ease of operation of a sander 1 can be improved.

In one or more embodiments, the rear-end part of the dust-collecting nozzle may be configured to be detachable from a hose that is connected to a suction apparatus, which suctions dust. The battery holster may comprise a mounting part, on which the suction apparatus is mountable. The length of the cord main body may be 2.0 m or more. In addition, the length of the cord main body may be 6.0 m or less.

According to the above-mentioned aspect, it is possible to inhibit the cord main body from being pulled between the abrading-machine main body and the suction apparatus and to inhibit the cord main body from obstructing abrading work.

In one or more embodiments, the portable abrading machine may comprise the dust-collection container.

According to the above-mentioned aspect, because the portable abrading machine is configured such that, when in the first state, the dust-collection container and the power-supply cord do not make contact with each other, the dust-collection container and the power-supply cord are inhibited from rubbing against each other due to vibration generated by the orbital motion. Consequently, durability of the power-supply cord can be improved and, as a result, durability of the portable abrading machine can be improved.

In one or more embodiments, the abrading-machine main body may further comprise a controller, which is configured to control rotation of the motor.

According to the above-mentioned aspect, because the connection between the controller and the motor is performed inside the abrading-machine main body, the power-supply cord can be configured more narrowly than the situation in which the controller is disposed in the battery holster. Consequently, it is possible to inhibit the power-supply cord from obstructing abrading work.

In one or more embodiments, the controller may be disposed between the auxiliary grip part and the dust-collecting nozzle in the up-down direction.

According to the above-mentioned aspect, the abrading-machine main body can be made smaller, and ease of operation of the portable abrading machine can be improved.

In one or more embodiments, the battery holster may comprise a controller, which is configured to control rotation of the motor.

According to the above-mentioned aspect, because vibration due to the orbital motion during abrading work can be inhibited from being transmitted to the controller, the life of the controller can be lengthened. In addition, the abrading-machine main body can be made smaller than a configuration in which the abrading-machine main body comprises the controller.

In one or more embodiments, the battery holster may comprise the battery, which is mounted on the battery-mounting part.

According to the above-mentioned aspect, because the battery is mounted on the battery holster, the abrading-machine main body can be made lightweight. Consequently, ease of operation of the abrading-machine main body can be improved.

First Embodiment

The sander 1 is explained below, with reference to FIG. 1 to FIG. 6, as one embodiment of a portable abrading machine. The sander 1 comprises a sander main body 10, a battery holster 80, and a power-supply cord 70, which connects the sander main body 10 and the battery holster 80. The sander 1 may also be called a random orbit sander.

The sander main body 10 comprises a housing 20 and an abrading part 50. The housing 20 comprises: a main-body housing 21, which houses a motor 40 (refer to FIG. 4); a controller-housing part 35, which houses a controller 60; and a handle part 30. The abrading part 50 is disposed on one side of the extension direction of rotational axis A1 of a motor shaft 42 and is configured to move with eccentric motion and rotational motion (random orbit motion) by rotating the motor 40. The handle part 30 is connected to the main-body housing on the other side of the extension direction of the motor shaft 42 opposite the side on which the abrading part 50 is disposed and extends in the direction leading away from the main-body housing 21. The sander main body 10 is a small-size sander, the entire weight of which is approximately 1.0 kg.

Hereinbelow, for the convenience of explanation, the extension direction of rotational axis A1 is defined as the up-down direction, the side on which the abrading part 50 is located relative to the main-body housing 21 is defined as the lower side, and the side opposite thereof is defined as the upper side. In addition, from among the directions orthogonal to the up-down direction, the direction in which the handle part 30 extends is defined as the front-rear direction; from among the front-rear directions, the side on which the part of the handle part 30 (a first end part 31 of the handle part 30) that connects to the main-body housing 21 is located is defined as the front side; and the side opposite thereof is defined as the rear side. Furthermore, the direction orthogonal to the front-rear direction and the up-down direction is defined as the left-right direction.

As shown in FIG. 1 to FIG. 4, the main-body housing 21 is formed along the up-down direction. The outer diameters of an upper-end part 23 and a lower-end part 24 of the main-body housing 21 are formed larger than the outer diameter of an intermediate part of the main-body housing 21 in the up-down direction. A switch 65 for switching the motor 40 between start and stop is provided on the front end of the upper-end part 23 of the main-body housing 21.

Figure 3:
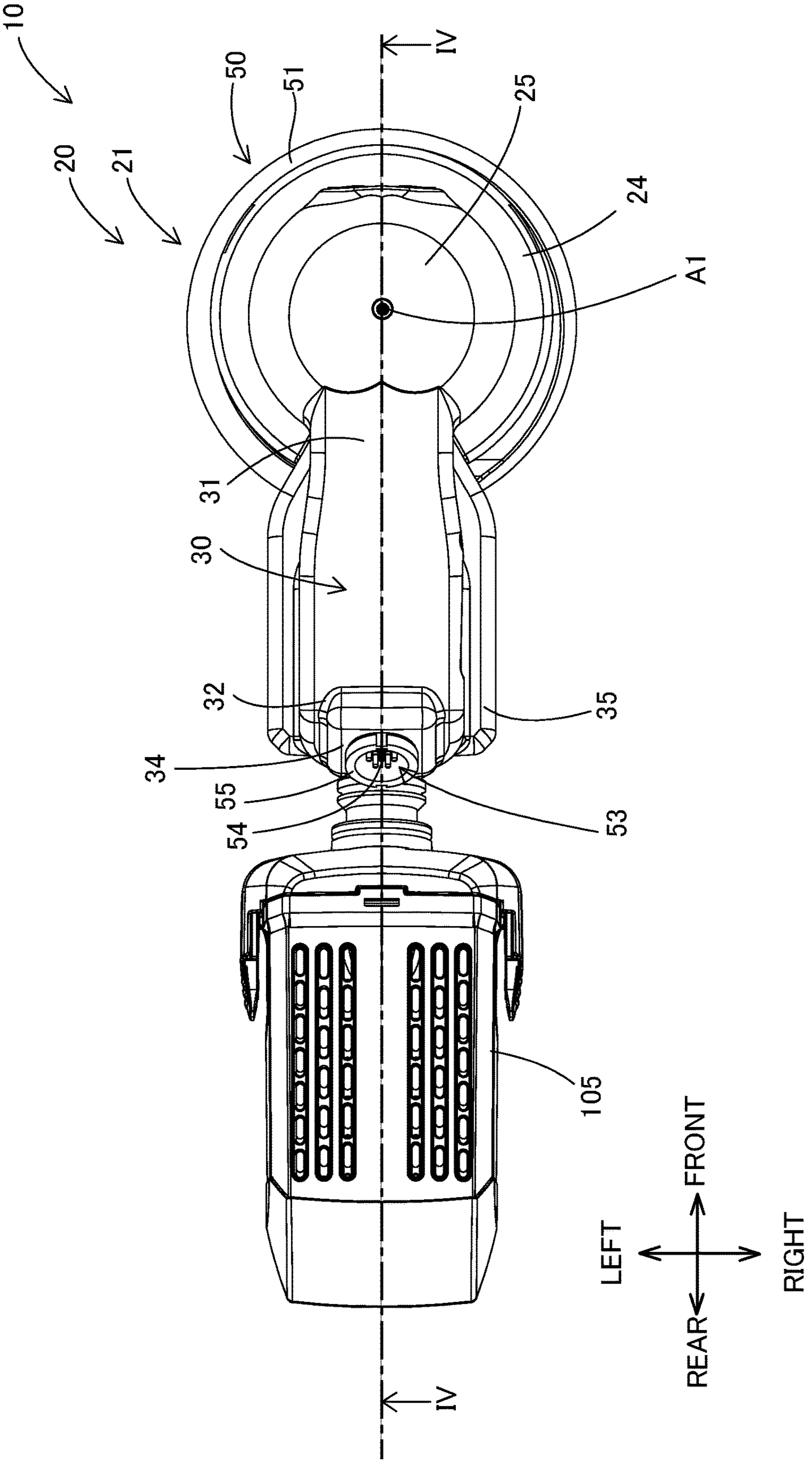
FIG. 3 is a top view of a sander main body according to the first embodiment.
Figure 4:
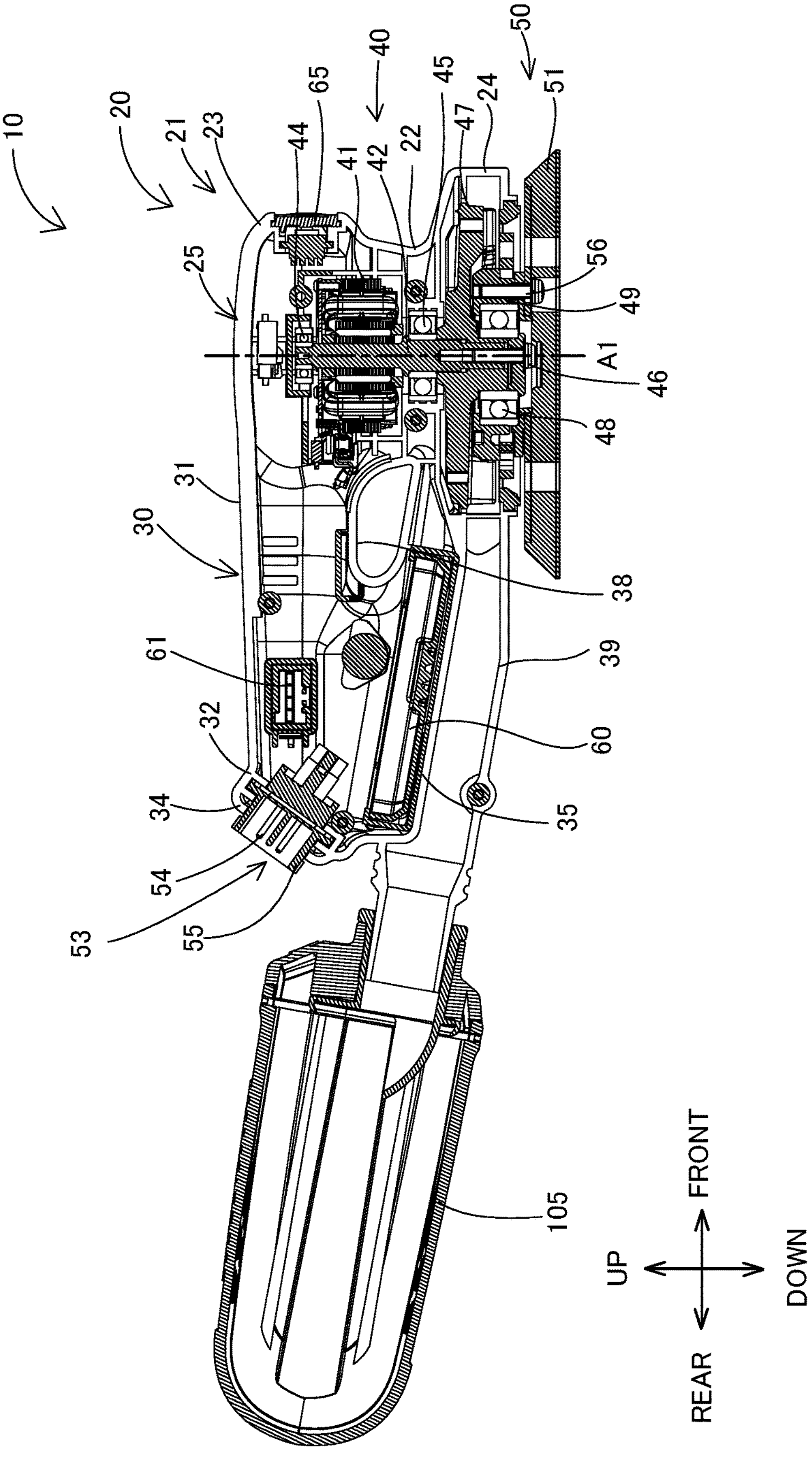
FIG. 4 is a longitudinal, cross-sectional view of the sander main body according to the first embodiment.

The upper-end part 23 of the main-body housing 21 has a size and a shape that is suited for the user to grip. The upper-end part 23 of the main-body housing 21 functions as a grip part (below, a main grip part 25) of the sander main body 10. As shown in FIG. 3 and FIG. 4, the main grip part 25 is formed in substantially a circular shape in top view. When the main grip part 25 and the motor 40 are viewed from upward of the main grip part 25 in the direction of rotational axis A1, the main grip part 25 has a shape and a size that overlaps the motor 40 such that the outer edge of the main grip part 25 surrounds the outer edge of the motor 40.

With regard to the handle part 30, the first end part 31 is connected to the main grip part 25 and extends along the front-rear direction rearward from the main grip part 25. A second connector 53, which is described below, is provided on a rear-end part (second end part 32) of the handle part 30. The width of the handle part 30 in the left-right direction is formed with a width suited to be gripped by the user. In addition, the upper end of the handle part 30 and the upper end of the main grip part 25 are formed smoothly. The user can grip the main grip part 25 with one hand, grip the handle part 30 with the other hand, and then can perform abrading work. In addition, when the user grips the main grip part 25 with one hand, the vicinity of the wrist of that one hand can also be disposed at the handle part 30. The handle part 30 functions as an auxiliary grip part of the sander main body 10.

The controller-housing part 35 is disposed on the lower side of the handle part and extends in the front-rear direction. The controller-housing part 35 is connected to a rear-end lower portion of the intermediate part 22 of the main-body housing 21 and extends from that connection location rearward toward the upper side. An upper-side portion of a rear portion of the controller-housing part 35 is connected to a lower-side portion of a rear portion of the handle part 30. A through hole 38, through which the housing 20 passes in the left-right direction, is formed between an upper-side portion of a front portion of the controller-housing part 35 and a lower-side portion of a front portion of the handle part 30.

A dust-collecting nozzle 39 is disposed on the lower side of the controller-housing part 35. The dust-collecting nozzle 39 extends in the front-rear direction. The dust-collecting nozzle 39 communicates with the rear end of the lower-end part 24 of the main-body housing 21. The dust-collecting nozzle 39 is provided such that it tilts rearward toward the upper side from the connection location between the main-body housing 21 and the lower-end part 24. A rear-end part 391 of the dust-collecting nozzle 39 protrudes more to the rear side than the handle part 30. In the present embodiment, a dust-collecting pack 105 is connected to the rear-end part 391 of the dust-collecting nozzle 39. Dust generated by the work of abrading the work material is discharged from through holes, which are provided in an abrading pad 51, into the dust-collecting pack 105 via the lower-end part 24 of the main-body housing 21 and the dust-collecting nozzle 39.

As shown in FIG. 3, when the handle part 30, the controller-housing part 35, and the dust-collecting nozzle 39 are viewed in the up-down direction from upward of the handle part 30, the controller-housing part 35 and the dust-collecting nozzle 39 are disposed overlapping the handle part 30. The controller-housing part 35 is disposed between the handle part 30 and the dust-collecting nozzle 39 in the up-down direction and is formed slightly larger than the handle part 30 and the dust-collecting nozzle 39 in the left-right direction.

As shown in FIG. 4, the motor 40, which is housed in the main-body housing 21, comprises: a motor main body 41, which comprises a stator and a rotor; and a motor shaft 42, which extends in the up-down direction. The motor shaft 42 is supported by bearings 44, 45, which are held by the main-body housing 21.

A fan 47 is orthogonally fixed to the lower end of the motor shaft 42 via a bolt 46, which extends in the up-down direction. The fan 47 is disposed in the lower-end part 24 of the main-body housing 21.

A bearing box 49 is further mounted eccentrically to the fan 47 via a bearing 48, which is provided eccentric to rotational axis A1 of the motor shaft 42.

The abrading part 50 comprises the abrading pad 51. The abrading pad 51 is formed in a disk shape, and sandpaper is mountable thereon. The abrading pad 51 is joined to the bearing box 49 by a bolt 56, which extends in the up-down direction. A bottom surface of the abrading pad 51 functions as an abrading surface, which abrades the work material when the sander main body 10 is used. In the present embodiment, the drive axis of the abrading part 50 is also rotational axis A1 of the motor 40. In the sander main body 10, when the motor rotates, that rotation is transmitted to the bearing box 49 via the bearing 48, which is eccentric to the motor shaft 42, and thereby the bearing box 49 and the abrading pad 51 move with eccentric motion and rotational motion.

The second connector 53 is provided on the second end part 32 of the handle part 30. On the second end part 32 of the handle part 30, the second connector 53 is provided on a tilted wall 34, which tilts from the upper end of the handle part 30 toward a rearward-lower portion. The second connector 53 comprises: terminal parts 54, which include positive and negative power-supply terminals and a communication terminal or communication terminals; and a tube wall 55, which surrounds the terminal parts 54 and protrudes diagonally upward from the tilted wall 34. A first connector 71 of the power-supply cord 70, which is described below, is connected to the second connector 53 in a detachable manner. The controller 60, which is housed in the controller-housing part 35, is electrically connected to the second connector 53 and the motor 40. The controller 60 comprises various circuits and is configured to control the operation of the motor 40 by controlling the electric power supplied from a battery 101, which is mounted on the battery holster 80, to the motor 40.

Figure 2:
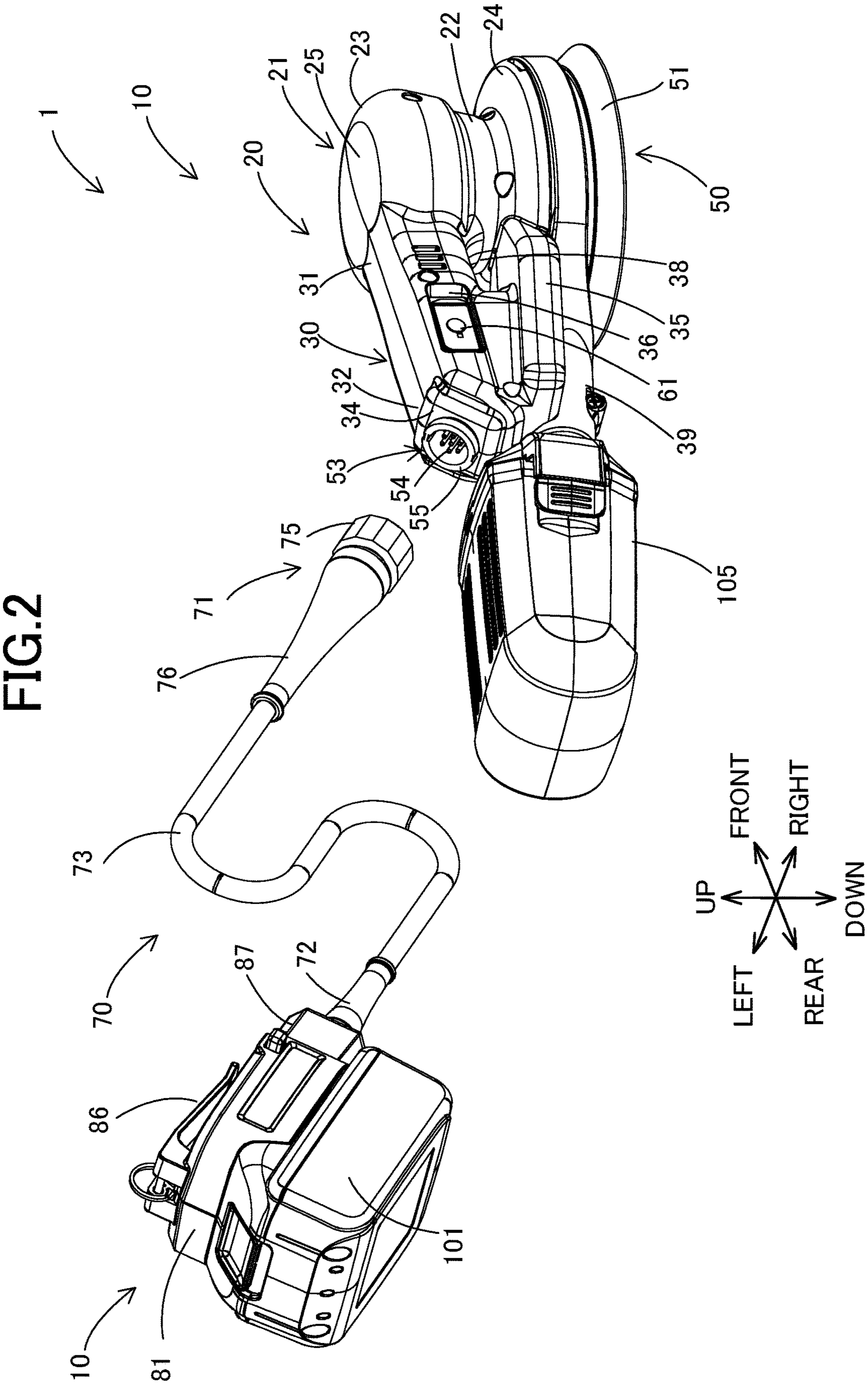
FIG. 2 is a separate oblique view of the sander according to the first embodiment.

As shown in FIG. 1 and FIG. 2, an adapter-housing part 36 is provided on a right wall at a rear portion of the handle part 30. The adapter-housing part 36 is a region into which a sidewall of the rear end of the handle part 30 is recessed. As shown in FIG. 4, a wireless-communication adapter 61 is mounted on/in the adapter-housing part 36 by being inserted therein. The wireless-communication adapter 61 is electrically connected to the controller 60. The wireless-communication adapter 61 wirelessly communicates with other accessory equipment. The accessory equipment is, for example, a dust collector that is connectable to the dust-collecting nozzle 39 and suctions in cuttings. The start operation and the stop operation of the accessory equipment are linked by wireless communication with the start operation and the stop operation of the sander main body 10. An association (pairing) is formed between the wireless-communication adapter 61 and a wireless-communication adapter 61, mounted on the accessory equipment in advance, in order to enable wireless communication therebetween. Pairing is performed by pressing both the button of the wireless-communication adapter 61 and the button of the wireless-communication adapter 61 of the accessory equipment. The buttons are, for example, buttons for activating a WPS function or an AOSS function. When the sander main body 10 is started by the user turning ON the switch 65 of the sander main body 10 in the paired state, such start information is transmitted from the wireless-communication adapter 61 to the accessory equipment. The accessory equipment receives a signal from the wireless-communication adapter 61 and starts based on that signal. The wireless communication enabled state can be known by a lamp, which is provided on the wireless-communication adapter 61, being turned ON.

Next, the battery holster 80 and the power-supply cord 70 will be explained, with reference to FIGS. 1, 2, 5, and 6. The battery holster 80 comprises a block-shaped battery-holster, main-body part 81, a battery-mounting part 85, and a hook 86. The battery holster 80 comprises a battery-holster-side connection part 87, to which one end 72 of the power-supply cord 70 is physically connected.

Figure 5:
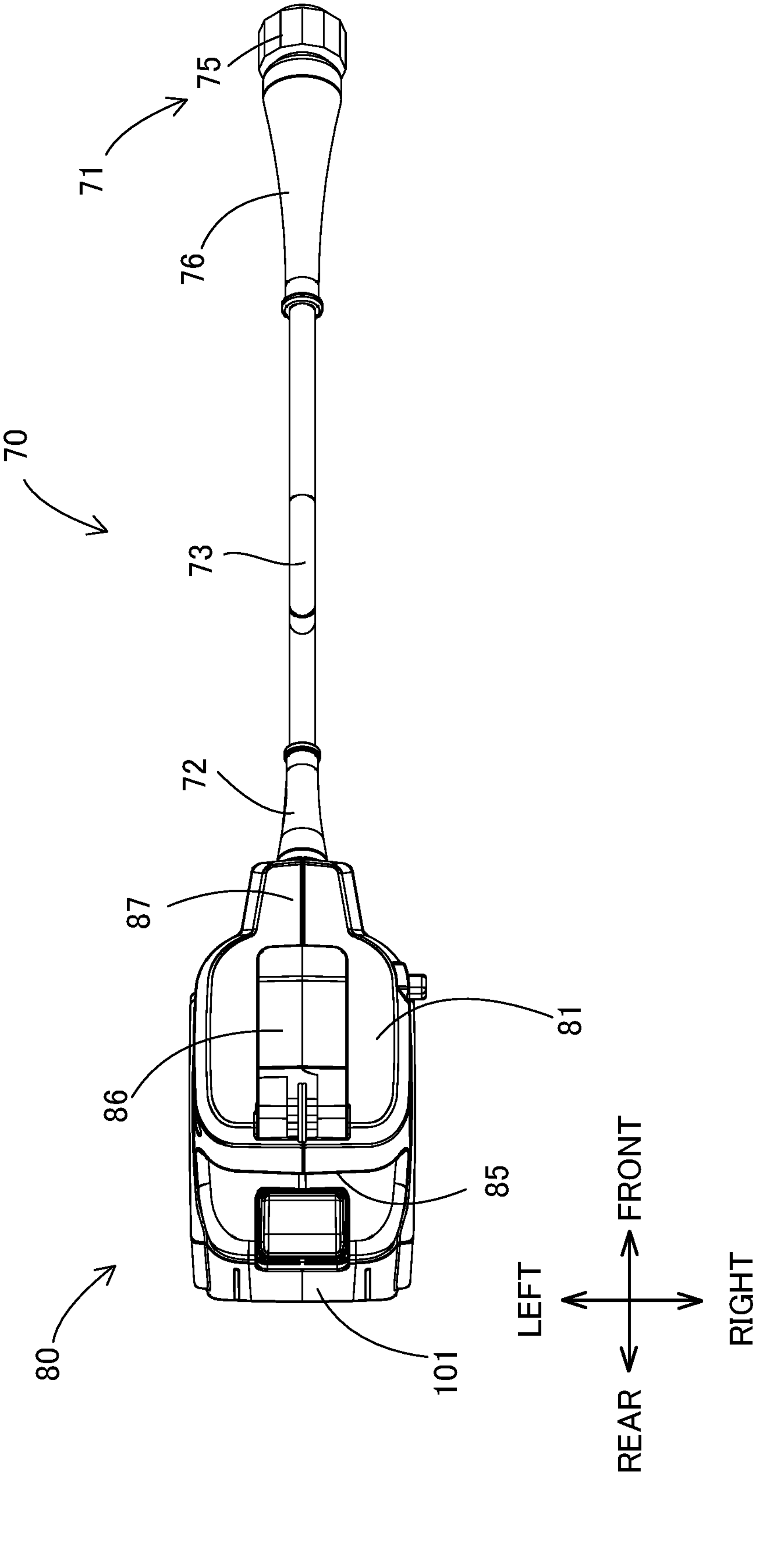
FIG. 5 is a top view of a battery holster, on which a battery is mounted, and a power-supply cord according to the first embodiment.
Figure 6:
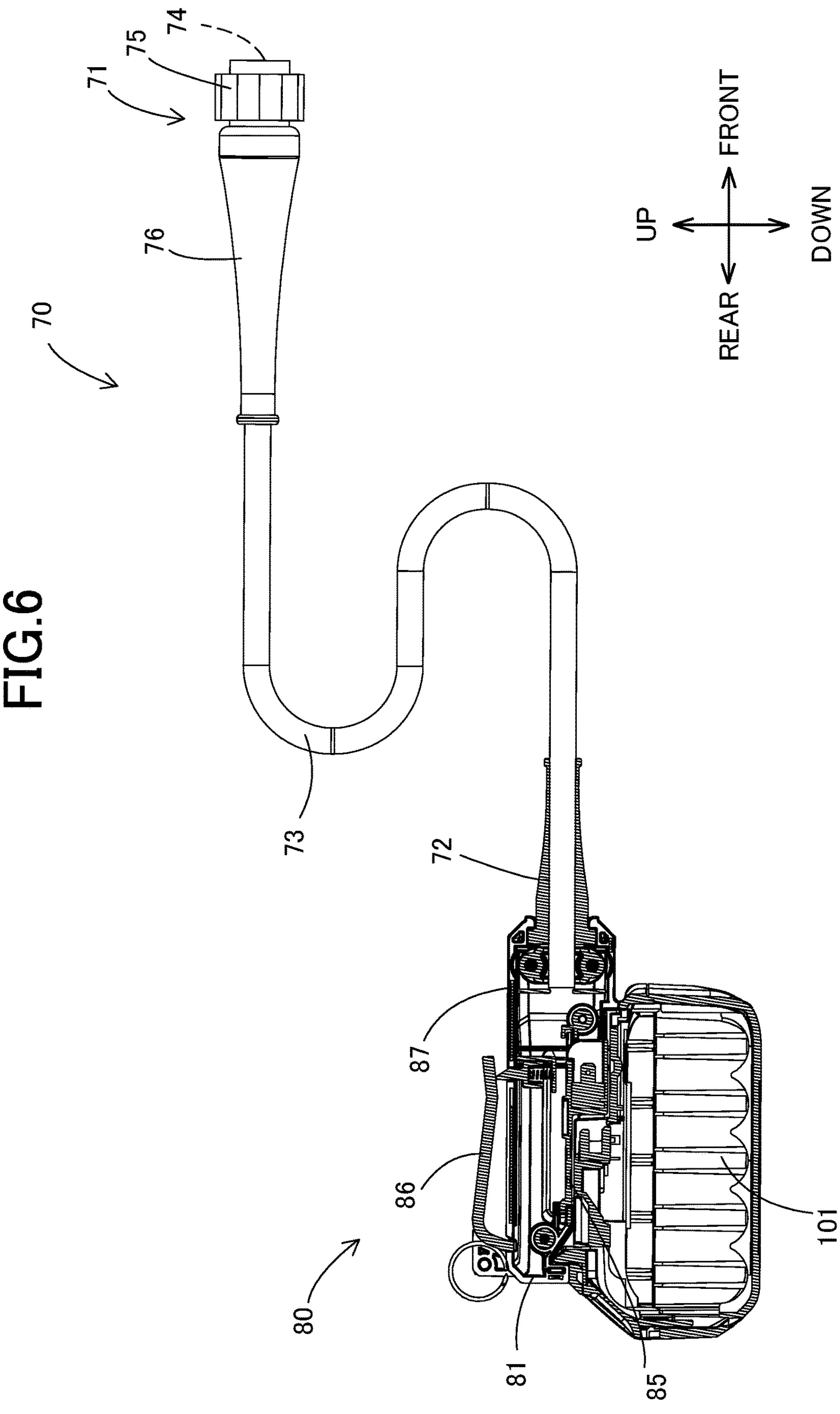
FIG. 6 is a drawing that shows the power-supply cord and a longitudinal, cross-sectional view of the battery holster, on which the battery is mounted, according to the first embodiment.

FIGS. 5 and 6 show the battery holster 80 and the power-supply cord 70 when the battery 101, which is mounted on the battery-mounting part 85, is placed downward, the battery-holster-side connection part 87 is disposed on the front side, and the power-supply cord 70, which is connected to the battery-holster-side connection part 87, is disposed in the front-rear direction.

The battery-mounting part 85 is provided in an opening recessed portion (not shown) formed in a lower portion of the battery-holster, main-body part 81. The battery-mounting part 85 comprises a pair of left and right slide rails, which extends in the front-rear direction, positive and negative power-supply terminals, and a communication terminal or communication terminals. The pair of slide rails is configured to be engageable with a pair of rail-receiving parts, which the battery 101 comprises. The pair of rail-receiving parts engages with the slide rails by sliding the battery 101 from a rear portion of the battery-mounting part in the mounting direction (rear to front) relative to the battery-mounting part 85, and thereby the battery 101 is mounted on the battery-mounting part 85. When the battery 101 is mounted on the battery-mounting part 85, the positive and negative power-supply terminals and the communication terminal(s) of the battery-mounting part 85 are electrically connected to the positive and negative power-supply terminals and the communication terminal(s) of the battery 101, respectively.

The hook 86 protrudes upward and forward from a rear-upper portion of the battery-holster, main-body part 81. The hook 86 is formed such that the battery holster 80 can be mounted on the user's garment or belt. The hook 86 may be a mounting part for the battery holster 80 to be worn by the user.

The battery-holster-side connection part 87 is a portion that protrudes from the front end of the battery-holster, main-body part 81. The battery-holster-side connection part is physically connected to the one end 72 of the power-supply cord 70.

The weight of the battery holster 80 of the present embodiment when the battery 101 has been mounted is approximately 0.7-1.0 kg. Consequently, the weight ratio of the battery holster 80, on which the battery 101 is mounted, relative to the sander main body is relatively large.

The power-supply cord 70 electrically connects the sander main body 10 and the battery holster 80 and physically connects (couples) the sander main body 10 and the battery holster 80 not via the housing. It is also possible for the power-supply cord 70 to not be covered by a housing. The power-supply cord 70 comprises a cord main body 73 and the first connector 71.

The cord main body 73 is constituted by covering power-supply lines for supplying electric power of the battery 101 to the sander main body 10 with a protective tube. The tube is formed of polyvinyl chloride resin (PVC). The tube may be formed of some other synthetic resin, e.g., rubber or a rubber mixture. Those power-supply lines are electrically connected to the power-supply terminals provided on the battery-mounting part 85. The cord main body 73 may comprise, in addition to the power-supply lines, a signal line or signal lines for the controller 60 to detect abnormalities of the battery 101.

The first connector 71 is provided at an end portion of the cord main body 73 opposite that of the one end 72. The first connector 71 comprises: a terminal part 74, which is connected to the power-supply lines of the cord main body 73; and a tubular-shaped engaging part 75, which is provided around the terminal part 74. The periphery of the first connector 71 of the cord main body 73 is covered by a substantially conical-cylinder-shaped cover 76, the outer diameter of which becomes large as it goes toward the first connector 71.

The first connector 71 is configured to be detachable from the second connector 53 of the sander main body 10. In the present embodiment, the first connector 71 and the second connector 53 are configured such that, when the engaging part 75 of the first connector 71 is fitted onto the tube wall 55 of the second connector 53, the terminal part 74 of the first connector 71 and the terminal part 54 of the second connector 53 are electrically connected to each other.

With regard to the sander 1 configured as described above, when the battery is mounted on the battery-mounting part 85 of the battery holster 80 and the switch 65 of the sander main body 10 is turned ON by the user, electric power of the battery 101 can be supplied to the sander main body 10 via the power-supply cord 70. In the present embodiment, electric power of the battery 101 is supplied to the controller 60 via the power-supply terminals of the battery-mounting part 85, the power-supply lines of the cord main body 73, the terminal part 74 of the first connector 71, and the terminal part 54 of the second connector 53. As shown in FIGS. 1 and 2, the terminal part 74 is in the form of a plug that is inserted into the terminal part 54, which is in the form of a socket and includes a plurality of pins that are electrically connected to the controller 60 and the motor 40. The controller 60 is connected to the motor 40 by lead lines (the power-supply lines and the signal line(s)) and controls the electric power supplied to the motor 40. When the motor 40 rotates, the abrading part 50 (the abrading pad 51) moves with eccentric motion and rotational motion (random orbit motion), and thereby the work of abrading a work material becomes possible.

According to the sander 1 of the first embodiment, the sander main body 10 comprises the abrading part 50, which is configured to move with orbital motion. The battery 101, which increases the weight quite a bit, is mounted on the battery-mounting part 85 of the battery holster 80, and the sander main body 10 and the battery holster 80 are connected by the power-supply cord 70 not via a housing. Consequently, because the battery 101 is not mounted on the sander main body 10, the weight of the sander main body 10 during abrading work can be lessened compared with a configuration in which the battery 101 is mounted on the sander main body. Accordingly, ease of operation of the sander 1, as well as the sander main body 10, can be improved.

In addition, according to the sander 1 of the first embodiment, because the weight of the sander main body 10 is small compared with that of the configuration in which the sander main body comprises a battery, in situations in which the position of the work material is not downward facing in the vertical direction, the user can easily manipulate the sander main body 10 even in the situation in which the user performs abrading work while supporting the sander main body 10. In addition, the load on the user during the abrading work can be reduced.

In addition, with regard to a sander configured to move with orbital motion, there are situations in which, compared with one that does not move with orbital motion, instead of improving performance, such as increasing abrading precision, vibration tends to occur. However, with regard to the sander 1 of the present embodiment, because the battery is not mounted on the sander main body 10, vibration that arises owing to orbital motion tends not to be transmitted to the battery-mounting part 85 or the battery 101. Consequently, the life of the battery-mounting part 85 and the battery 101 can be lengthened.

According to the sander 1, by using the hook 86 the user can perform abrading work by wearing the battery holster 80. In addition, the battery holster 80 and the sander main body 10 are connected by the power-supply cord 70 not via the housing 20. Consequently, compared with the configuration in which the battery holster 80 and the sander main body 10 are connected by the housing, it is possible to increase the number of degrees of freedom in the positional relationships between the battery holster 80 and the sander main body 10.

The main-body housing 21 of the sander main body 10 houses the motor 40, and the abrading part 50 is provided downward of the main-body housing 21. In addition, the main grip part 25 is provided on the upper end of the main-body housing 21. When the main grip part 25 and the motor 40 are viewed from upward of the main grip part 25 in the direction of rotational axis A1, the outer edge of the main grip part 25 is disposed overlapping the motor 40 so as to surround the outer edge of the motor 40. Consequently, the user can easily perform abrading work by gripping the main grip part 25 and pressing the sander main body 10 downward, and vibration that arises owing to the orbital motion of the abrading part 50 can be dealt with effectively.

In addition, the sander main body 10 comprises the handle part 30, which extends rearward from the main grip part 25. Consequently, because the user can perform abrading work by gripping the main grip part 25 with one hand while gripping the handle part with the other hand and then pressing the sander main body 10 toward to the work material, abrading work can be performed stably.

In addition, when the user has gripped the main grip part 25 with one hand, it is also possible for the user to dispose the vicinity of the wrist of that one hand at the handle part 30. In so doing, because the vicinity of the user's wrist can be supported by the handle part 30 when gripping the main grip part 25 with one hand to perform abrading work, it is possible to reduce the load applied to the user's hand or wrist.

The sander main body 10 comprises the second connector 53, which is configured to be detachable from the first connector 71 of the power-supply cord 70. Consequently, because the power-supply cord 70 and the battery holster 80 can be carried and stored separately from the sander main body 10, the handling of the entire sander 1 becomes easy compared with a configuration in which the power-supply cord 70 is connected in advance to the sander main body in an undetachable manner. In addition, the battery holster and the power-supply cord 70 can be used by connecting them to some other portable abrading machine having the second connector 53.

The second connector 53 is provided on a rear-end part (the second end part 32) of the handle part 30, which extends rearward from the main grip part 25. Consequently, because the second connector 53 is disposed at a location of the sander main body 10 that is spaced apart from the abrading part 50, the second connector 53 can inhibit the power-supply cord 70 from obstructing abrading work. In addition, in the situation in which the handle part 30 is disposed on the user side, the abrading part 50 is disposed on the side distant from the user, and the user performs abrading work while wearing the battery holster 80 using the hook 86, the power-supply cord 70 is located in the vicinity of the user's own body, and therefore it is possible to further inhibit the power-supply cord 70 from obstructing abrading work.

In addition, the sander main body 10 comprises the dust-collecting nozzle 39, and, when the handle part 30 and the dust-collecting nozzle 39 are viewed in the up-down direction from upward of the handle part 30, the dust-collecting nozzle 39 is disposed at a location overlapping the handle part 30. Consequently, by providing the dust-collecting nozzle 39, enlargement of the sander main body 10 can be curtailed, and the sander main body 10 can be configured compactly.

In addition, because the sander main body 10 comprises the controller 60, the cord main body 73 can be configured (manufactured) more narrowly (with a smaller diameter) than an embodiment in which: (i) the battery holster comprises the controller 60; and thus (ii) the lead lines (i.e. relatively high current power supply lines) that connect the controller 60 and the motor 40 to supply driving currents to the motor 40 must also be disposed within the cord main body 73 of the power-supply cord 70, thereby necessitating a thicker cord main body (cable). Accordingly, it is possible to design the cord main body 73 such that it is less likely to obstruct abrading work.

The controller 60 is housed in a portion (the controller-housing part 35) between the handle part 30 of the housing 20 and the dust-collecting nozzle 39 in the up-down direction. Consequently, the sander main body 10 can be configured compactly. In addition, because the controller-housing part 35 does not obstruct abrading work, ease of operation of the sander 1 can be improved.

Figure 7:
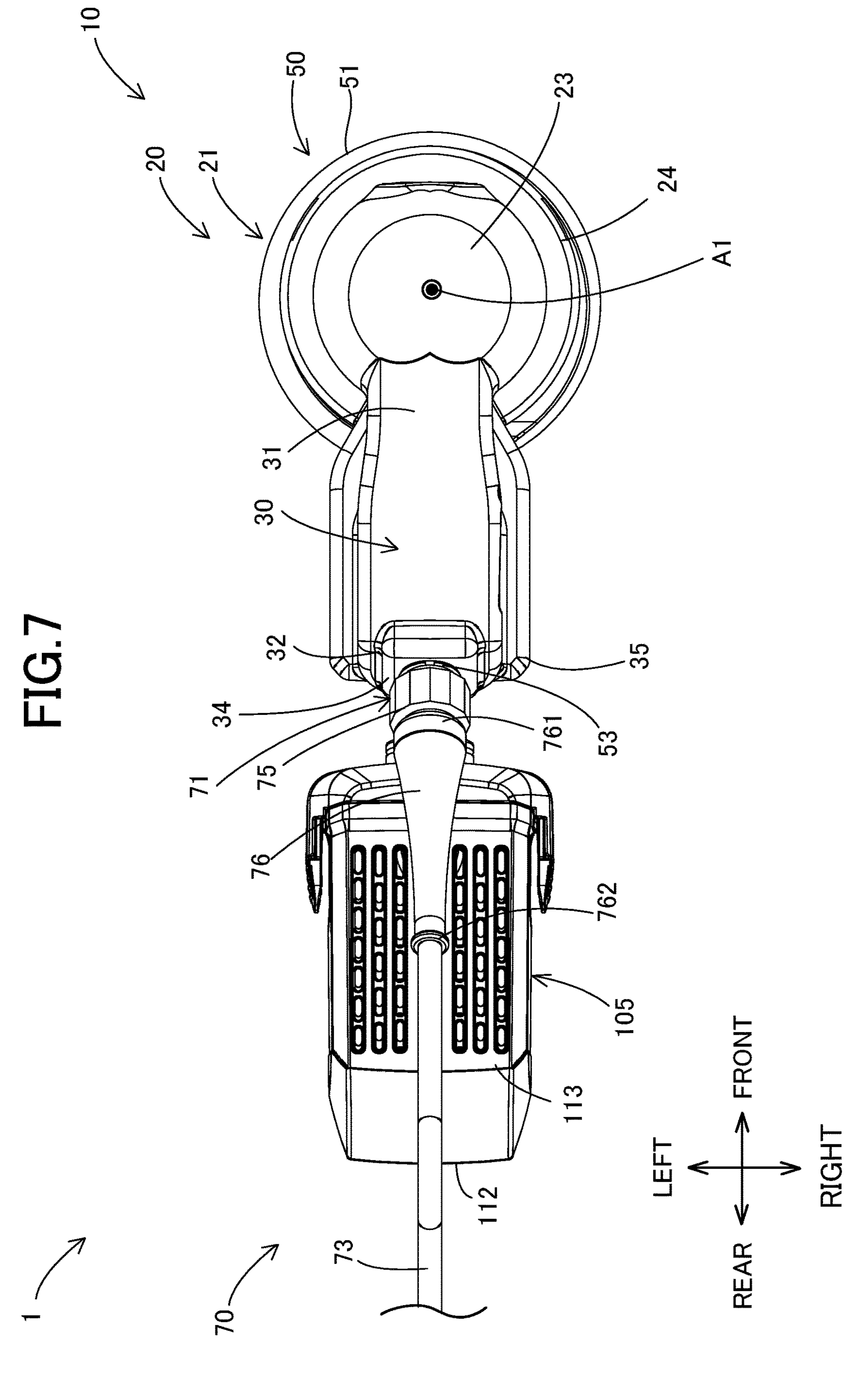
FIG. 7 is a top view of the sander main body, to which the power-supply cord is connected, according to the first embodiment.
Figure 8:
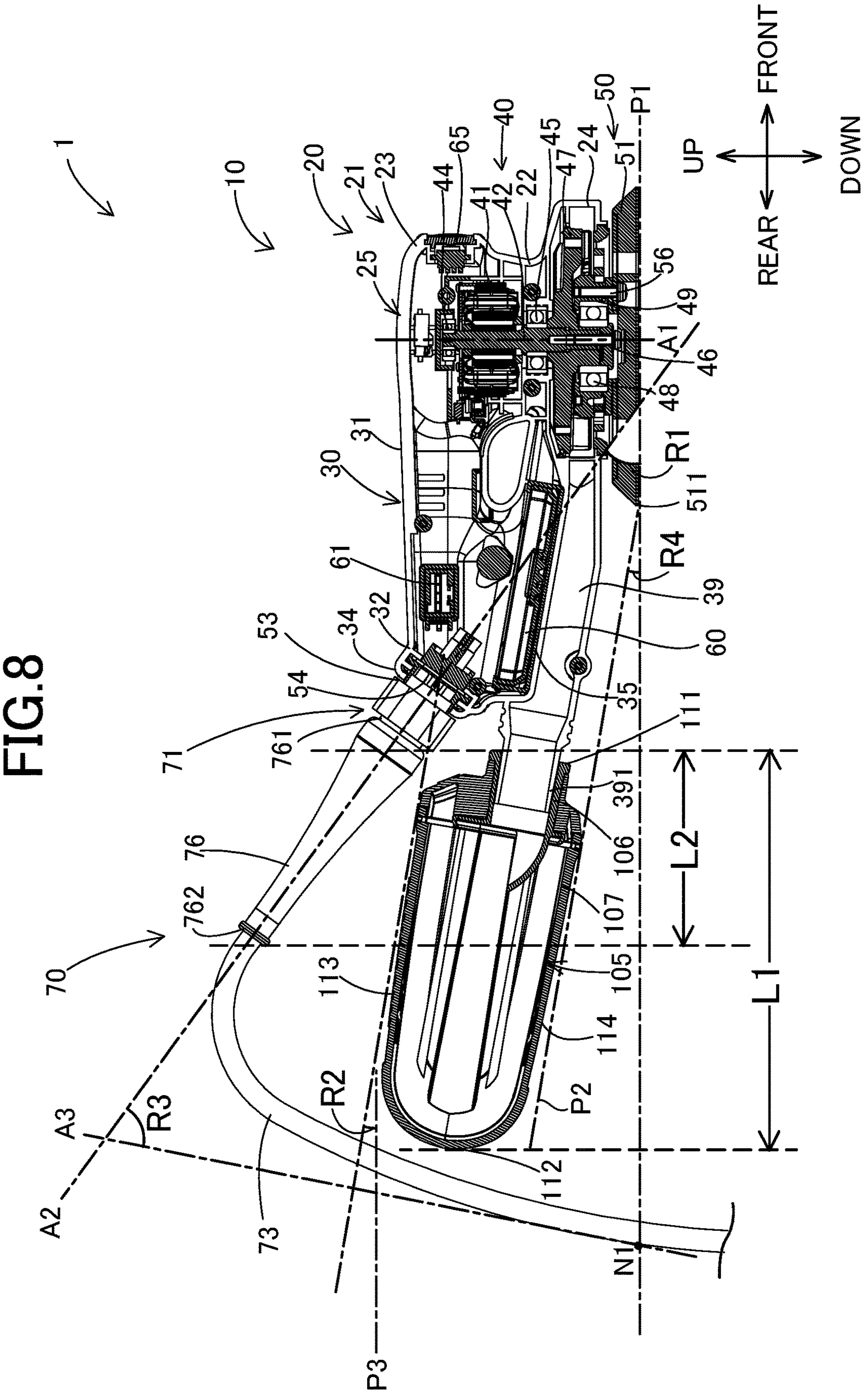
FIG. 8 is a longitudinal, cross-sectional view of the sander in a first state.
Figure 9:
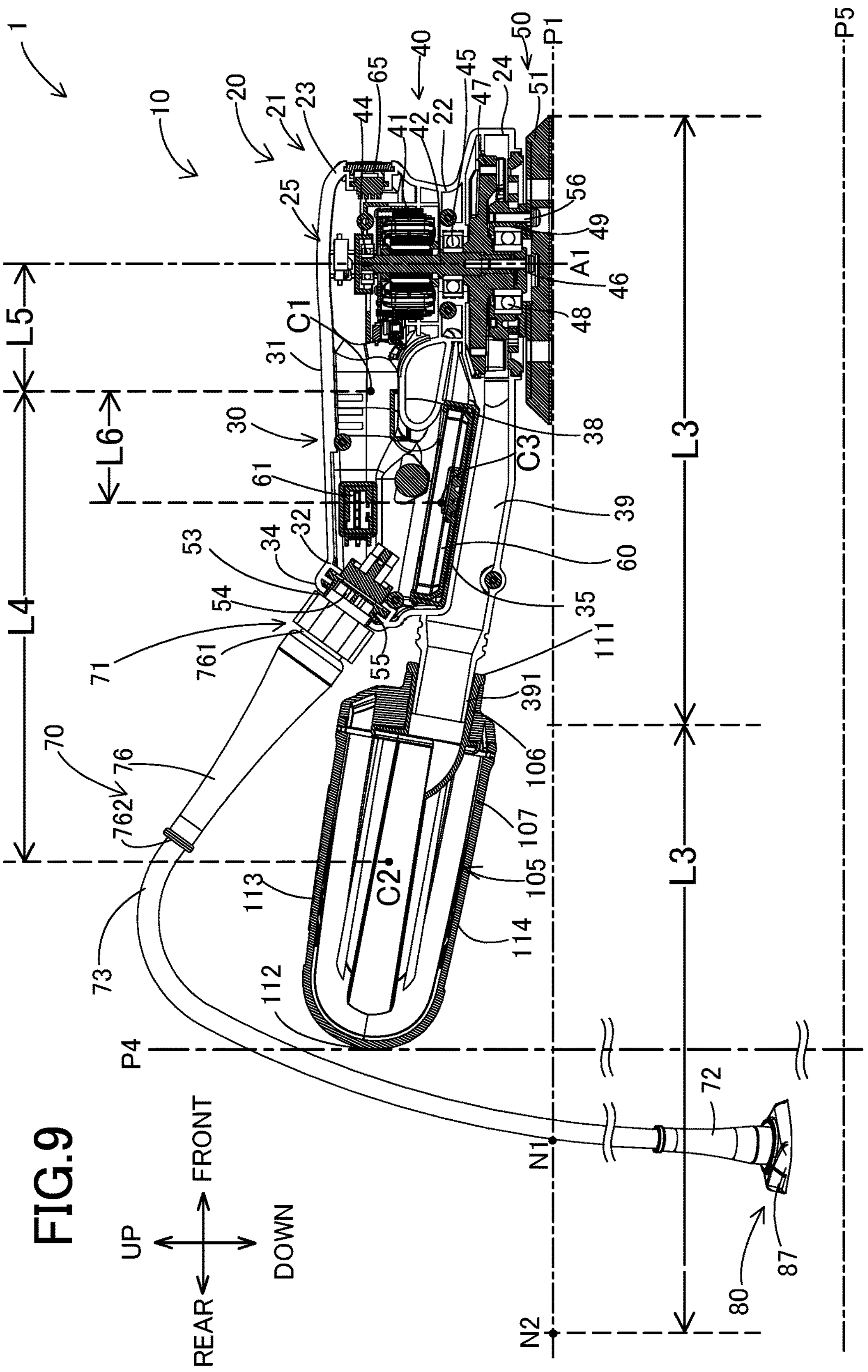
FIG. 9 is a longitudinal, cross-sectional view of the sander in the first state.

In FIG. 7 to FIG. 9, the sander 1 is shown in the state (hereinbelow, also called the first state) in which conditions (i)-(iv) below are satisfied. In the first state, the sander 1 of the present embodiment is configured such that the dust-collecting pack 105 and the power-supply cord 70 do not contact each other.

(i): The dust-collecting pack 105 is connected to the dust-collecting nozzle 39.

(ii): The abrading pad 51 is placed on a level surface.

It is noted that the level surface may be a surface (horizontal plane) that is orthogonal to the up-down direction. The level surface may be, for example, a surface that is being processed (abraded). In FIG. 8 and FIG. 9, a virtual plane (first virtual plane P1), which includes (contains) that level surface, is illustrated.

(iii): The battery holster 80 and the sander main body 10 are connected by the power-supply cord 70.

In the example shown in FIGS. 7-9, the first connector 71 and the second connector 53 are connected to each other.

(iv): The battery holster 80 is disposed directly rearward of the rear end of the dust-collection container 105 and below the level surface P1 but such that the intrinsic weight of the battery holster 80 is not applied to the power-supply cord 70.

In the example shown in FIG. 8 and FIG. 9, the battery holster 80 is placed on a prescribed surface (not shown) that is downward of first virtual plane P1 and the battery holster 80 is located directly rearward of the dust-collection container 105.

The condition (iv) can be satisfied in the situation in which the battery holster 80 is worn on a user's belt or the like using the hook 86, and the user performs abrading work using the sander main body 10 (the sander 1).

In the present embodiment, the first state further includes the state in which the sander 1 satisfies additional conditions (a)-(c) below. Additional conditions (a)-(c) below relate mainly to the state (attitude, arrangement) of the battery holster 80.

(a): The battery holster 80 is disposed more rearward than a rear end 112 of the dust-collecting pack 105.

In FIG. 9, a virtual plane (fourth virtual plane P4), which passes through the rear end of the dust-collecting pack 105 and is orthogonal to the front-rear direction, is shown. In the present embodiment, the battery holster 80 is located more rearward than fourth virtual plane P4.

(b): The portion of the battery holster 80 that connects with the power-supply cord 70 faces upward.

In the example shown in FIG. 9, the portion of the battery holster 80 (the battery-holster-side connection part 87) that is connected to the one end 72 of the power-supply cord faces upward.

(c): The battery holster 80 is disposed more upward than the lower-end position of the power-supply cord 70 when the power-supply cord 70 is extended downward.

In FIG. 9, a virtual plane (fifth virtual plane P5), which is orthogonal to the up-down direction and passes through the lower end (the one end 72) of the power-supply cord 70 when the cord main body 73 is extended downward, is shown. In the example shown in FIG. 9, the battery holster 80 is located more upward than fifth virtual plane P5. It is noted that the power-supply cord 70 (the cord main body 73) being extended downward is also the state in which the cord main body 73 has been dangled more downward than the sander main body in the state in which the cord main body 73 has no bends. The cord main body 73 being extended downward can also mean the state in which the cord main body 73 is fully extended. Even if the intrinsic weight of the battery holster 80 is not applied to the cord main body 73, the cord main body can be extended downward owing to the layout relationship between the battery holster 80 and the sander main body 10.

The sander 1 of the present embodiment is configured such that, when in the first state described above, the dust-collecting pack 105 and the power-supply cord 70 do not make contact with each other (are spaced apart). Consequently, even if the dust-collecting pack 105 vibrates due to vibration generated by the orbital motion, the dust-collecting pack and the power-supply cord 70 are inhibited from rubbing against each other. As a result, wear of the power-supply cord 70 is inhibited.

In particular, the sander main body 10 of the present embodiment comprises the handle part 30, which extends in the front-rear direction; and the motor 40, which is a vibration source, and the abrading part 50 are disposed on the front side of the handle part 30. In addition, the dust-collecting pack 105 protrudes more rearward than the handle part 30 and is connected to the rear-end part 391 of the dust-collecting nozzle 39. Consequently, in the situation in which the user grips the main grip part 25 and presses the abrading part 50 against the work material to perform abrading work, the dust-collecting pack 105 can vibrate quite strongly. However, according to the sander 1 of the present embodiment, because the dust-collecting pack 105 and the power-supply cord 70 are configured such that they do not make contact with each other, wear of the power-supply cord 70 is inhibited. Accordingly, the durability of the sander 1 can be improved.

Here, the dust-collecting pack 105 will be explained. The dust-collecting pack of the present embodiment comprises a mounting part 106 and a dust-collection part 107. The mounting part 106 is configured to be detachable from the rear-end part 391 of the dust-collecting nozzle 39. The dust-collection part 107 is connected to the mounting part 106 and extends rearward from the mounting part 106. The dust-collection part 107 stores the dust discharged from the dust-collecting nozzle 39 and is configured to be capable of discharging the air delivered from the dust-collecting nozzle 39. In the present embodiment, the dust-collection part 107 comprises: an external case, which has an exhaust hole for air; and a storage portion, which is provided in the interior of the external case and is capable of storing dust. In the present embodiment, the dust-collecting pack 105 is formed of a synthetic resin. In another embodiment, the dust-collecting pack 105 may be formed from a container made of cloth or paper.

The configuration of each part of the sander 1 that contributes to the improvement of the durability and ease of operation of the sander 1 will be explained below. In particular, the configuration of the power-supply cord 70 and the sander main body 10 and the positional relationships among the power-supply cord 70, the sander main body 10, and the dust-collecting pack 105 will be explained in detail.

In the present embodiment, the cover 76 of the power-supply cord 70 extends rearward from the first connector 71 and covers a portion of the cord main body 73. Specifically, along a portion of the total length of the cord main body 73, the cover 76 is disposed on the outer side (outer circumference, radially outward) of the cord main body 73. In addition, the cover 76 is configured such that the flexibility of the cover 76 is less than the flexibility of the cord main body 73 (the protective tube that covers the power-supply lines). Owing to such a configuration, the cover 76 inhibits the cord main body 73 from making contact with the dust-collecting pack 105 while the cord main body 73 is guided rearward, which is its own extension direction.

The cover 76 is disposed upward of (directly above) the dust-collecting pack 105 and is spaced apart from the dust-collecting pack 105. In the front-rear direction, a front end 761 of the cover 76 is located at substantially the same location or slightly forward of a front end 111 of the dust-collecting pack 105. In addition, a rear end 762 of the cover 76 is located upward of (directly above) the dust-collecting pack 105. It is noted that axis A2, which passes through the center (center in the radial direction) of the cover 76, substantially coincides with an axis (not shown) that passes through the center of the first connector 71.

The cover 76 is configured to overlap the dust-collecting pack 105 by 30% or more in the front-rear direction. Length L1 shown in FIG. 8 is the length (front-rear-direction length, overall length) from the front end 111 of the dust-collecting pack 105 to the rear end 112, and length L2 is the length of the portion at which the cover 76 overlaps the dust-collecting pack 105. In the present embodiment, length L2 is approximately half of length L1. That is, the cover 76 overlaps approximately 50% of the dust-collecting pack 105.

When the sander 1 is in the first state, the cover 76 extends rearward and upward from the first connector 71. At this time, as shown in FIG. 8, axis A2 of the cover 76 and first virtual plane P1 intersect each other. In other words, angle R1, which is formed between axis A2 of the cover 76 and first virtual plane P1, is greater than 0. Owing to such a configuration, the cover 76 can guide the cord main body 73 rearward and upward.

In addition, in the present embodiment, angle R2, which is formed between an upper surface 113 of the dust-collecting pack 105 and first virtual plane P1, is smaller than angle R1, which is formed between axis A2 of the cover 76 and first virtual plane P1. That is, the rearward and upward tilt of the cover 76 is larger than the tilt of the dust-collecting pack 105. Thereby, the cover 76 can effectively inhibit the cord main body 73 from making contact with the upper surface 113 of the dust-collecting pack while the cord main body 73 is guided rearward and upward. It is noted that, in FIG. 8, for the sake of convenience in the drawing, angle R2 is indicated as an angle formed between the upper surface 113 and third virtual plane P3, which is parallel to first virtual plane P1.

The cord main body 73, which has been guided rearward and upward by the cover 76, bends downward at a prescribed location in the front-rear direction, passes mere rearward of the rear end 112 of the dust-collecting pack 105 as shown in FIG. 8, and intersects first virtual plane P1 at point of intersection N1. As shown in FIG. 8, angle R3 is formed between axis A2 of the cover 76 and tangent line A3. Here, it is noted that tangent line A3 intersects the point of intersection N1 of first virtual plane P1 and the cord main body 73 and extends in the same direction as the curve of the portion of the cord main body 71 at the point of intersection N1. Angle R3 preferably is 55° or more. By setting angle R3 to 55° or more, the cord main body 73 passes rearward of the dust-collecting pack 105 without making contact with the dust-collecting pack 105 and then bends downward. Consequently, wear of the cord main body 73 can be inhibited. In addition, angle R3 preferably is 90° or less. By setting angle R3 to 90° or less, the cord main body 73 can be designed (configured) such that it does not start to bend downward at a location that is excessively rearward of the rear end 112 of the dust-collecting pack 105. Consequently, obstruction of abrading work by the cord main body 73 can be avoided. That is, by configuring the power-supply cord 70 such that angle R3 is 55° or more and 90° or less, it is possible to achieve an improvement in the durability of the power-supply cord 70 (the cord main body 73) and an improvement in ease of operation of the sander 1.

Length L3 (front-rear-direction length, overall length) of the sander main body (i.e. from the rear-end part 391 of the dust-collecting nozzle 39 to the forwardmost end of the sander main body 10) is shown in FIG. 9. Location N2 is located at a distance equal to length L3 rearward of rear-end part 391; i.e. the distance from N2 to the forwardmost end of the sander main body 10 equals two times length L3. In the present embodiment, location N1, at which the cord main body 73 intersects first virtual plane P1, is forward of the rearward location (i.e. location N2) corresponding to the length L3 portion of the sander main body 10 from the rear-end part 391 of the sander main body 10. By configuring the sander main body and the power-supply cord 70 in this manner, the cord main body 73 bends downward rearward of the sander main body 10 without excessively extending rearward from the sander main body 10. Consequently, it is possible to effectively achieve an improvement in the durability of the power-supply cord 70 and an improvement in ease of operation of the sander 1.

FIG. 8 shows second virtual plane P2, which makes contact with the lower end (a lower surface 114) of the dust-collecting pack 105 and passes through a rear end 511 of the abrading pad 51. Angle R4, which is formed between first virtual plane P1 and second virtual plane P2, preferably is 5° or more. Owing to such a configuration, even if the dust-collecting pack 105 vibrates or the front end of the abrading part 50 is lifted slightly upward during abrading work, the lower end (the lower surface 114) of the dust-collecting pack 105 tends not to make contact with the work material. In addition, angle R4 preferably is 15° or less. Owing to such a configuration, the dust-collecting pack 105 and the cord main body 73 can be made spaced apart to a certain extent in the up-down direction. Consequently, it is possible to curtail a decrease in the durability of the dust-collecting pack 105 and the dust-collecting nozzle 39, to which the dust-collecting pack 105 is connected. Furthermore, because it is possible to inhibit the dust-collecting pack 105 from making contact with the work material and thereby causing damage to the work material, abrading precision can be increased.

It is noted that the length of the cord main body 73 preferably is 0.80 m (meters) or more. As described above, the hook 86 is provided on the battery holster 80 of the sander 1, and by using the hook 86 the user can wear the battery holster 80 on a belt or the like and then perform abrading work. In addition, with regard to the sander 1, the cord main body 73, which is guided rearward and upward by the cover 76, bends downward at the prescribed location in the front-rear direction, passes more rearward of the rear end 112 of the dust-collecting pack 105 as shown in FIG. 8, and intersects first virtual plane P1. In such a configuration, by setting the length of the cord main body to 0.80 m or more, regardless of the size of the user's own body, it is possible to inhibit the cord main body 73 from being pulled between the battery holster 80, which is worn by the user, and the sander main body 10, even of the user extends their arm. In addition, the length of the cord main body 73 preferably is 2.0 m or less. By setting the length of the cord main body 73 to 2.0 m or less, obstruction of abrading work by the cord main body 73 can be inhibited. Consequently, ease of operation of the sander 1 can be improved.

Next, the moment (mass moment) of the sander 1 will be explained. The sander main body 10 of the present embodiment is configured such that, in the state in which the dust-collecting pack 105 is mounted on the dust-collecting nozzle 39, the mass (mass moment) in the front-rear direction is balanced at a prescribed location (balance point C1; refer to FIG. 9) of the handle part 30.

FIG. 9 shows balance point C1, center point C2 in the front-rear direction of the dust-collecting pack 105, and center point C3 in the front-rear direction of the controller 60. In addition, FIG. 9 shows distance L4 between balance point C1 and center point C2 of the dust-collecting pack 105, distance L5 between balance point C1 and rotational axis A1 of the motor 40, and distance L6 between balance point C1 and center point C3 of the controller 60.

Distance L4 preferably is 0.150 m or more. In addition, distance L4 preferably is 0.200 m or less. By using such a configuration, the dust-collecting pack 105 can be disposed at a location at which it does not obstruct abrading work. Consequently, ease of operation of the sander 1 can be improved.

Distance L5 preferably is 0.040 m or more. In addition, distance L5 preferably is 0.100 m or less. By using such a configuration, the distance between balance point C1 and rotational axis A1 of the motor 40 can be curtailed from becoming too large while the length of the sander main body 10 can be set to a length that is easy to grip. Consequently, ease of operation of the sander 1 can be improved.

The mass moment from balance point C1 to rotational axis A1 of the motor preferably is 0.20 N·m (newton·meters) or more. In addition, that mass moment preferably is 0.50 N·m or less. By using such a configuration, the balance of the sander main body 10, on which the dust-collecting pack 105 is mounted, in the front-rear direction can be satisfactorily maintained. In addition, by configuring the sander main body 10 such that the mass moment from balance point C1 to center point C3 is within the above-mentioned range, it is possible to inhibit the moment of the front portion from balance point C1 from becoming too large. Consequently, the sander main body 10 that is suited to carrying can be provided.

It is noted that the shape of each part of the sander 1 of the present embodiment is as below. However, the numerical values below are merely examples, and the sander 1 may use other configurations (shapes) as long as the sander 1 comprises the power-supply cord 70 that physically and electrically connects the sander main body 10 and the battery holster 80 not via the housing.

- Distance L4 from balance point C1 to point C2: 0.185 m (meters)
- Distance L5 from balance point C1 to rotational axis A1 of the motor 40: 0.050 m
- Distance L6 from balance point C1 to point C3: 0.048 m
- Mass of the controller 60: 0.100 kg (kilograms)
- Mass of the dust-collecting pack 105: 0.130 kg
- Mass of the dust-collecting pack 105 in the situation in which the storage portion is filled with dust: 0.185 kg
- Mass of the front portion of the sander main body 10 from balance point C1: 0.780 kg
- Mass moment of the portion from balance point C1 to rotational axis A1 of the motor 40: 0.38 Nm (newton·meter)

Second Embodiment

Figure 10:
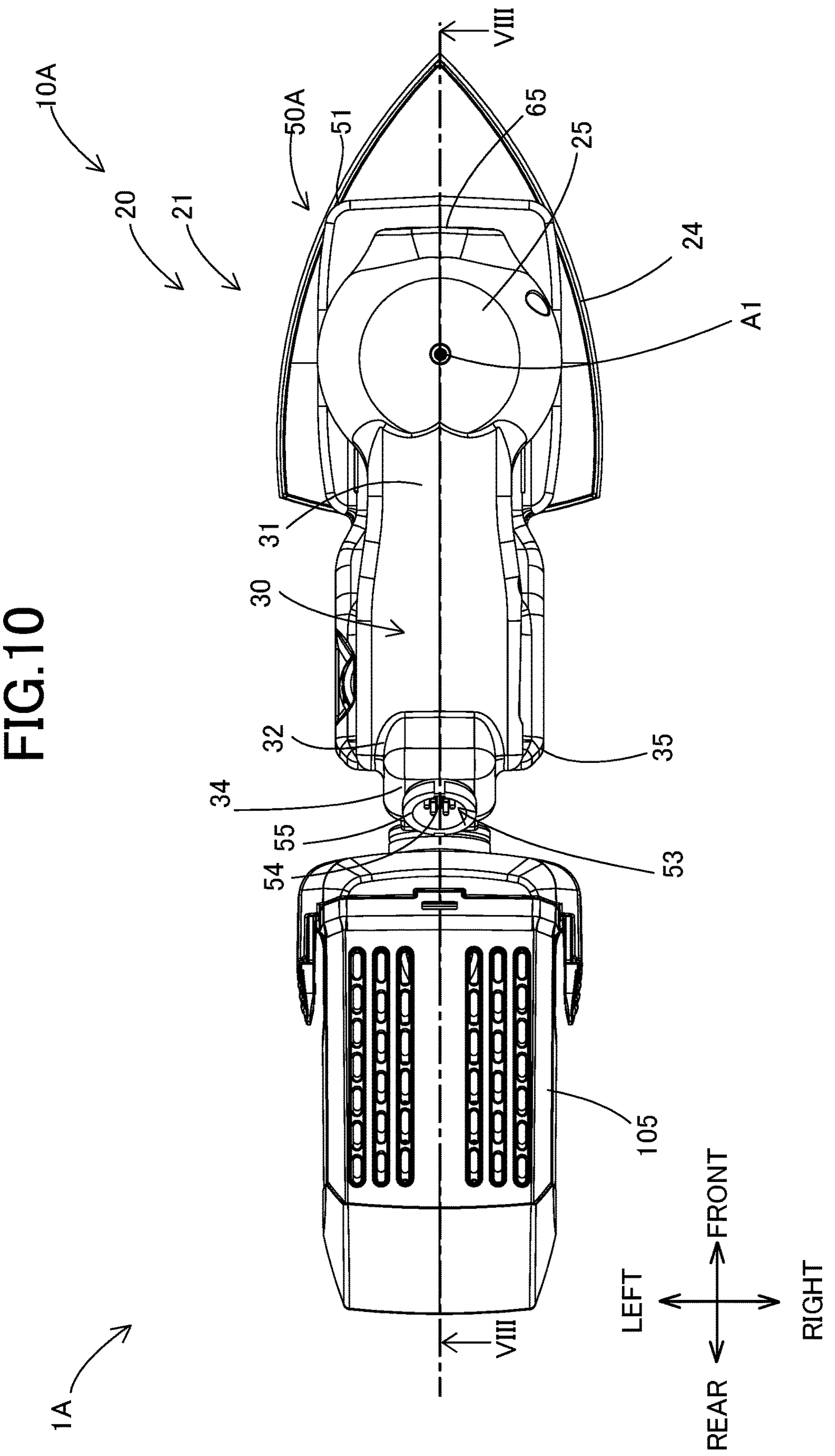
FIG. 10 is a top view of the sander main body according to a second embodiment.
Figure 11:
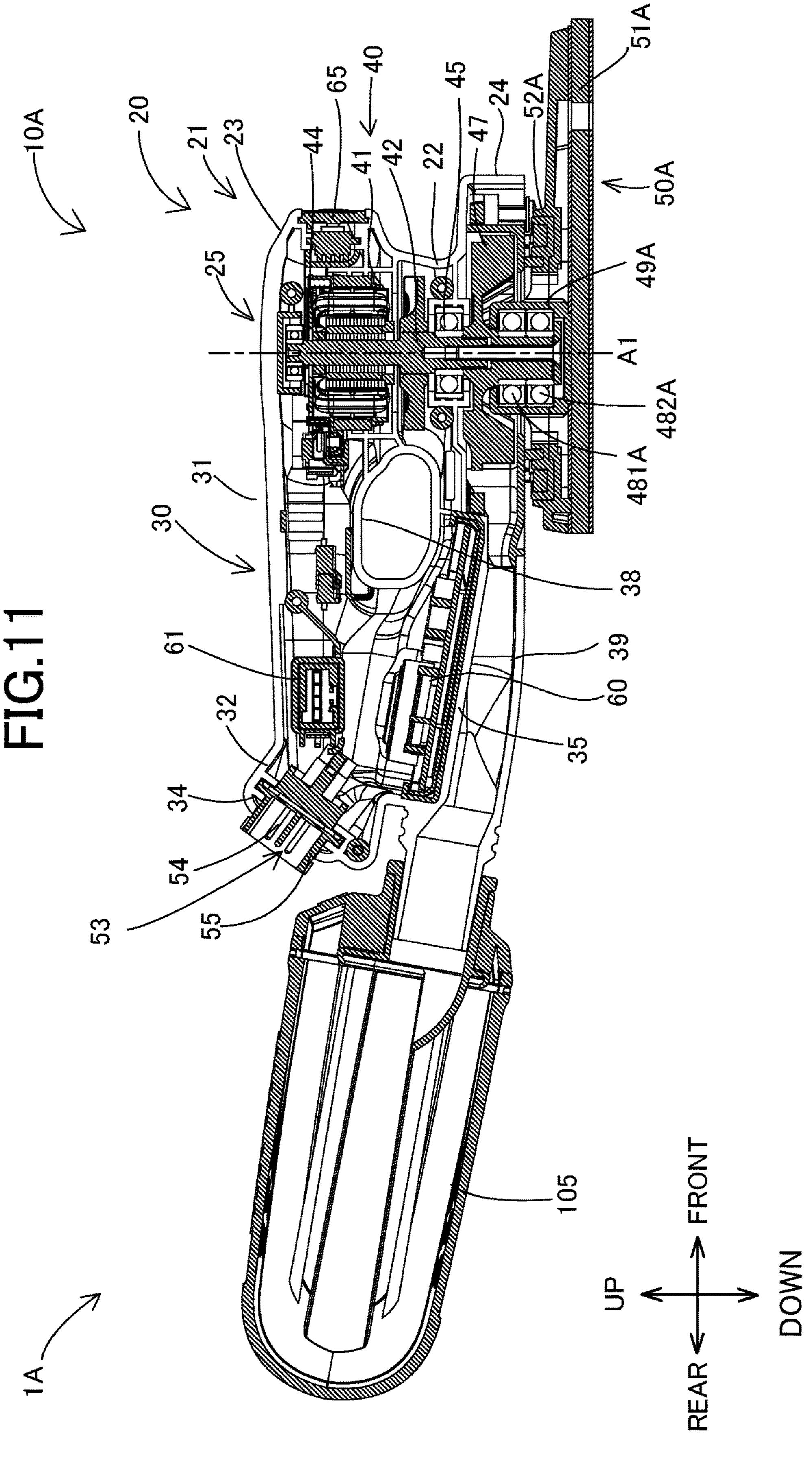
FIG. 11 is a longitudinal, cross-sectional view of the sander main body according to the second embodiment.

A sander 1A according to a second embodiment will now be explained, with reference to FIG. 10 and FIG. 11. Although the power-supply cord 70 and the battery holster 80 of the sander 1A do not appear in FIG. 10 and FIG. 11, the sander 1A of the present embodiment comprises the power-supply cord 70 and the battery holster 80, which were described in the first embodiment. It is noted that, hereinbelow, structural members that are the same as those as the embodiment described above are assigned the same symbols, and detailed descriptions thereof are omitted.

The main point of difference between the sander 1A of the present embodiment and the sander 1 of the first embodiment is that a sander main body 10A is configured as an orbital sander.

Specifically, an abrading part 50A of the sander main body 10A comprises an abrading pad 51A and a base 52A, which is provided on the abrading pad 51A. The base 52A and the housing 20 are coupled by at least one foot, which is not shown. The at least one foot constrains rotation of the base 52A.

In addition, with regard to the sander main body 10A of the present embodiment, the abrading pad 51A is formed into substantially a triangular shape having an acute angle when viewed in the up-down direction. Furthermore, with regard to the sander main body 10A, a bearing box 49A is further assembled to the fan 47 in an eccentric manner via bearings 481A, 482A, which are provided in the up-down direction eccentric to rotational axis A1 of the motor shaft 42. Other structural members of the sander 1A of the second embodiment are the same as those of the sander 1 of the first embodiment described above, and explanations thereof are omitted.

Except for the point in that rotational motion of the abrading part 50A of the sander main body 10A is inhibited, the sander 1A of the second embodiment has the same configuration as that of the sander 1 of the first embodiment. Consequently, effects the same as those of the sander 1 of the first embodiment are also exhibited by the sander 1A of the second embodiment.

It is noted that, with regard to the sander 1A of the present embodiment, the mass of the front portion from balance point C1 is 0.700 kg, and the mass moment of the portion from balance point C1 to rotational axis A1 of the motor 40 is 0.34 Nm (newton·meters). In the sander 1A, the configurations of the power-supply cord 70 and the sander main body 10A, the positional relationships among the power-supply cord 70, the sander main body 10A, and the dust-collecting pack 105, and the moment (mass moment) of the sander 1A are the same as those in the first embodiment, and therefore explanations thereof are omitted.

Third Embodiment

Figure 12:
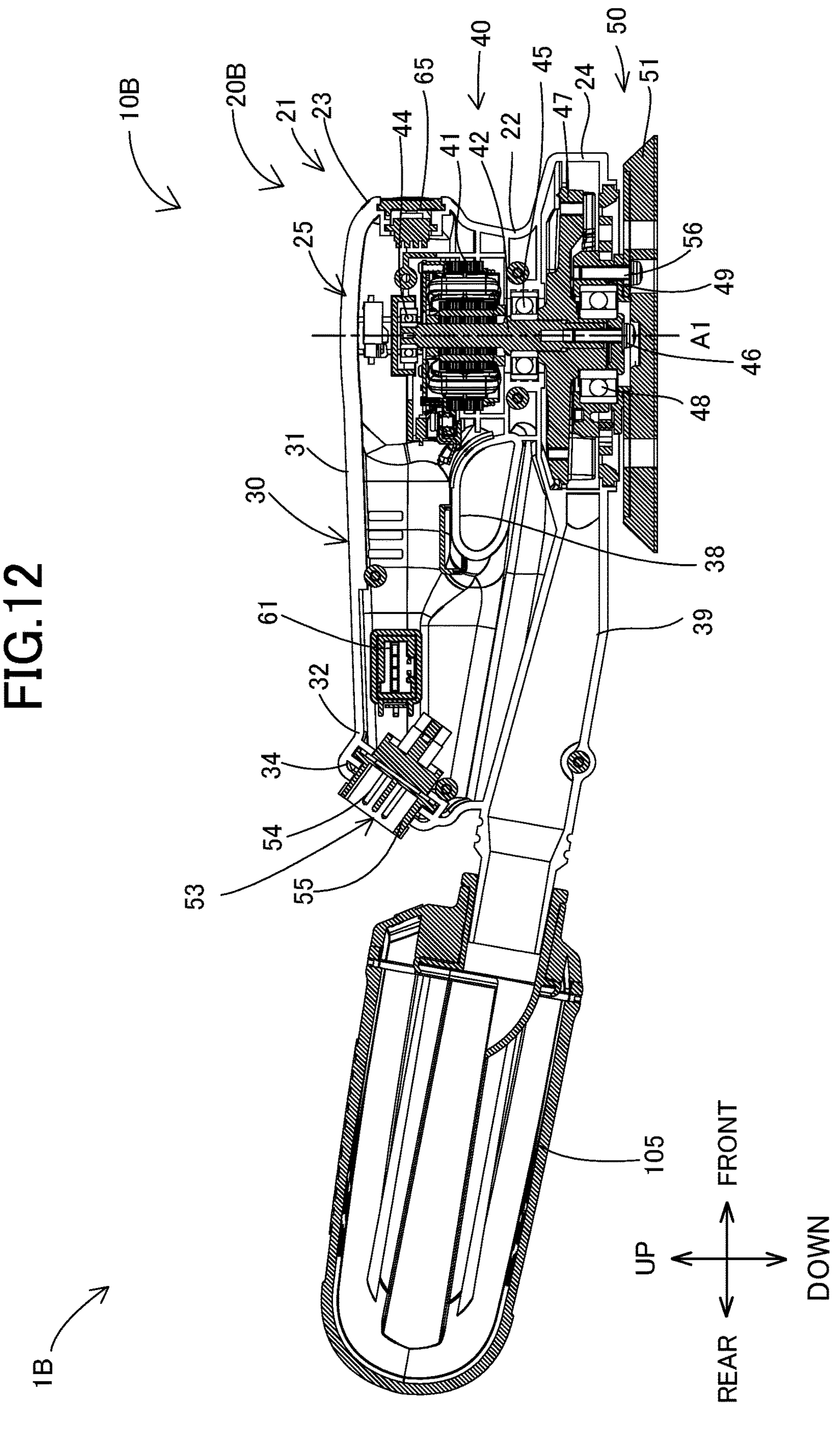
FIG. 12 is a longitudinal, cross-sectional view of the sander main body according to a third embodiment.
Figure 13:
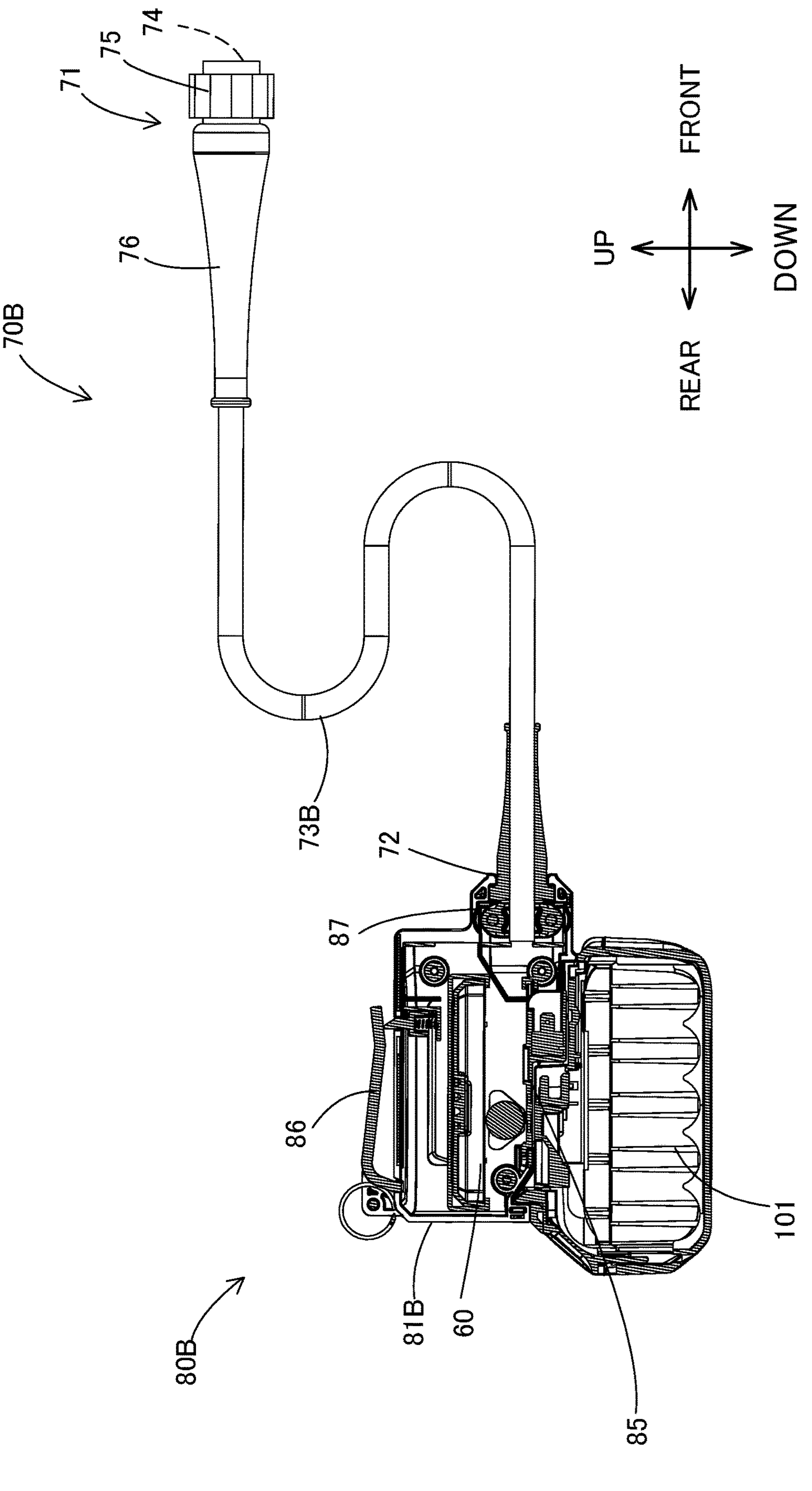
FIG. 13 is a drawing that shows the power-supply cord and a longitudinal, cross-sectional view of the battery holster, on which the battery is mounted, according to the third embodiment.

A sander 1B according to a third embodiment will now be explained, with reference to FIG. 12 and FIG. 13. The main point of difference between the sander 1B of the present embodiment and the sander 1 of the first embodiment is that a housing 20B of a sander main body 10B does not house the controller 60, and a battery-holster, main-body part 81B of a battery holster 80B houses the controller 60. As shown in FIG. 13, the battery-holster, main-body part 81B is formed larger than the battery-holster, main-body part 81 of the first embodiment in the up-down direction, and the controller 60 is housed in an upper portion of the battery-mounting part 85. In the present embodiment, the lead lines (power-supply lines and signal line(s)) from the controller 60, which is housed in the battery-holster, main-body part 81B, to the motor 40 of the sander main body 10B, as well as a signal line that transmits a signal representing the manipulation of the switch 65 to the controller 60, are inserted (extend) through the interior of a cord main body 73B.

With regard to the sander 1B of the third embodiment, when the battery 101 has been mounted on the battery-mounting part 85 of the battery holster 80B and the switch of the sander main body 10B has been turned ON by the user, electric power of the battery is controlled by the controller 60, which is housed in the battery-holster, main-body part 81B, and is supplied to the motor 40 of the sander main body 10B via a power-supply cord 70B. Other structural members of the sander 1B are the same as those of the sander 1 of the first embodiment, and therefore explanations thereof are omitted.

According to the sander 1B of the third embodiment explained above, the battery holster 80B, which is connected to the sander main body 10B by the power-supply cord 70B, comprises the controller 60. Consequently, it is possible to curtail the transmission of vibration generated by the orbital motion of the abrading part 50 to the controller 60 during abrading work.

In addition, because the controller 60 is not housed in the housing 20 of the sander main body 10B, the sander main body 10B can be configured compactly.

Except for the point in that the battery holster 80B comprises the controller 60, the sander 1B of the third embodiment comprises the same structural members as those of the sander 1 of the first embodiment. Consequently, effects the same as those of the first embodiment are also exhibited by the sander 1B of the third embodiment.

Fourth Embodiment

Figure 14:
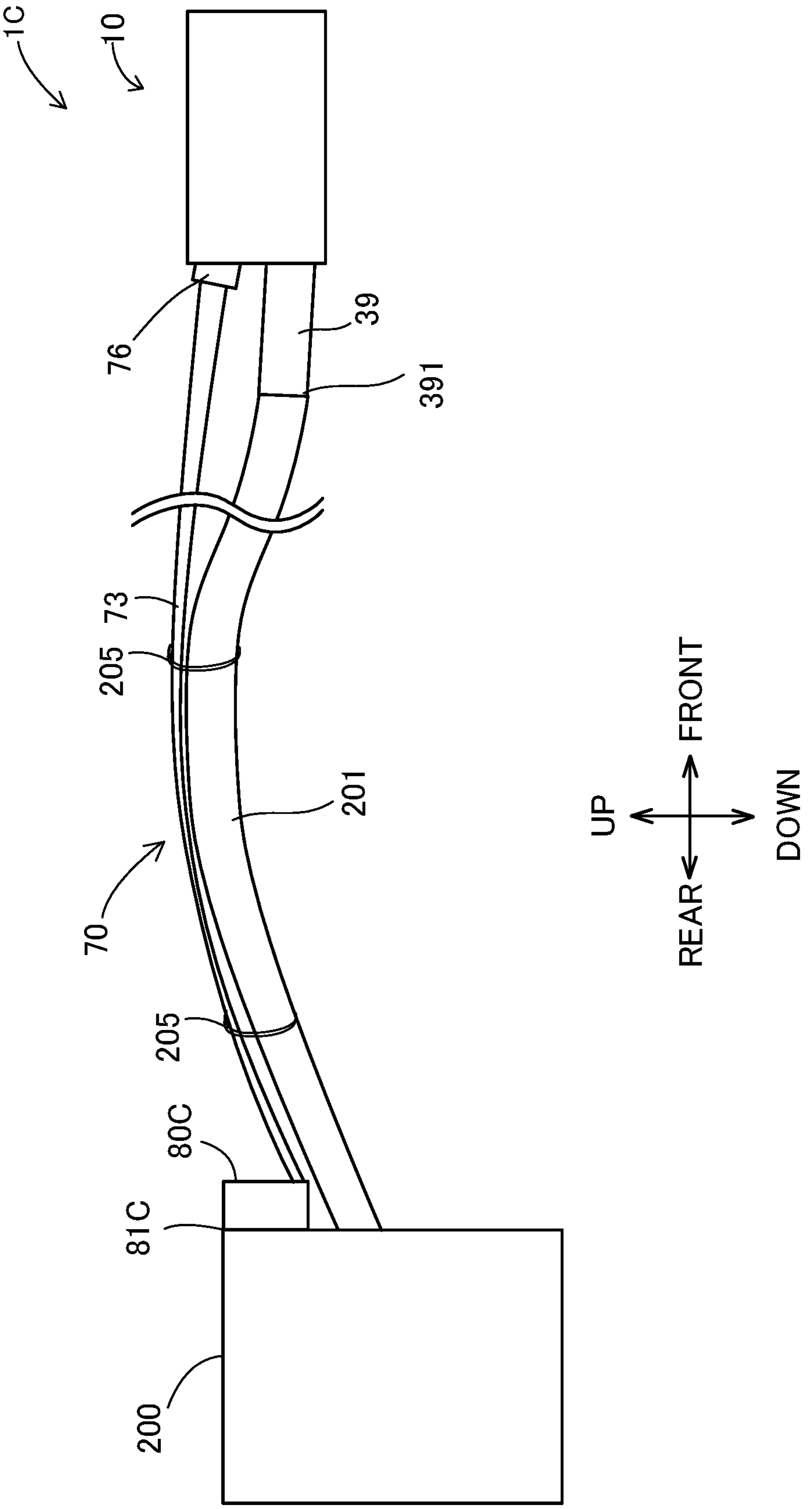
FIG. 14 is a simplified drawing of the configuration of a sander that is connectable to a cleaner.

A sander 1C according to a fourth embodiment will now be explained, with reference to FIG. 14. In the present embodiment, a hose 201 is mounted on the rear-end part 391 of the dust-collecting nozzle 39, and the sander main body 10 is connected to a cleaner 200 via the hose 201. In addition, in the present embodiment, a battery holster 80C comprises a mounting part 81C, which is capable of mounting the battery holster on the cleaner 200. The mounting part 81C may be, for example, a hook that is engageable with the cleaner 200. By operating the cleaner 200, dust generated by abrading work is suctioned into (stored in) the cleaner 200 via the hose 201. The cord main body 73 and the hose 201 are banded together by bands 205. The length of the cord main body 73 preferably is 2.0 m or more. In addition, the length of the cord main body 73 preferably is 6.0 m or less. By using such a configuration, it is possible to inhibit the cord main body 73 from being pulled between the sander main body 10 and the cleaner 200 and to inhibit the cord main body 73 from obstructing abrading work. Accordingly, ease of operation of the sander 1C can be improved.

Correspondence Relationships

The correspondence relationships among the structural elements of the above-mentioned embodiments and the structural elements of the techniques of the present disclosure are indicated below. However, the structural elements of the embodiments are merely examples and do not limit the structural elements of the techniques of the present disclosure.

The sanders 1, 1A, 1B, 1C are examples of the "portable abrading machine."

The sander main bodies 10, 10A, 10B are examples of the "abrading-machine main body."

The power-supply cords 70, 70B are examples of the "power-supply cord."

The motor 40 is an example of the "motor."

The main-body housing 21 and the housings 20, 20B are examples of the "main-body housing."

The abrading parts 50, 50A are examples of the "abrading part."

The battery 101 is an example of the "battery."

The battery-mounting part 85 is an example of the "battery-mounting part."

The battery holsters 80, 80B, 80C are examples of the "battery holster."

The cord main bodies 73, 73B and the power-supply cords 70, 70B are examples of the "power-supply cord."

The first connector 71 and the second connector 53 are examples of the "first connector" and the "second connector," respectively.

The upper-end part 23 is an example of the "upper-end part."

The main grip part 25 is an example of the "main grip part."

The handle part 30 is an example of the "auxiliary grip part."

The dust-collecting nozzle 39 is an example of the "dust-collecting nozzle."

The second end part 32 is an example of the "end portion on the side leading away from the main grip part."

The controller 60 is an example of the "controller."

The rear-end part 391 is an example of the "rear-end part."

The dust-collecting pack 105 is an example of the "dust-collection container."

The rear end 112 is an example of the "rear end of the dust-collection container."

The battery-holster-side connection part 87 is an example of the "connecting portion at which the battery holster connects to the power-supply cord."

The one end 72 of each of the power-supply cords 70, 70B is an example of the "lower end of the power-supply cord when the power-supply cord is extended downward."

The abrading pads 51, 51A are examples of the "abrading pad."

The cord main bodies 73, 73B are examples of the "cord main body."

The cover 76 is an example of the "cover."

Axis A2 is an example of the "axis that passes through the center of the cover."

Tangent A3 is an example of the "tangent."

First virtual plane P1 and second virtual plane P2 are examples of the "first virtual plane" and the "second virtual plane," respectively.

The hook 86 is an example of the "hook."

The mounting part 81C is an example of the "mounting part."

The cleaner 200 is an example of the "suction apparatus."

The hose 201 is an example of the "hose."

OTHER EMBODIMENTS

The first connector 71 of each of the power-supply cords 70, 70B may be connected to the sander main bodies 10, 10A, 10B in an undetachable manner. In addition, each of the power-supply cords 70, 70B may comprise a connector on the one end 72 side, and that connector and the battery holsters 80, 80B may be configured in a detachable manner.

The shapes of the housings 20, 20B of the sander main bodies 10, 10A, 10B are not limited to the shapes of the above-mentioned embodiments. For example, the housings 20, 20B do not have to comprise the handle part 30.

The second connector 53 may be provided at some other location of each of the housings 20, 20B. For example, the first end part 31 of the handle part 30 may be provided at the rear portion of the controller-housing part 35.

Instead of the hook 86 or in addition to the hook 86, the battery holsters 80, 80B may comprise some other mounting part, such as a belt, for mounting the battery holsters 80, 80B on the user.

In the embodiments described above, rotational axis A1 of the motor 40 is the drive axis of each of the abrading parts 50, 50A. In contrast, rotational axis A1 of the motor does not have to coincide with the drive axis of each of the abrading parts 50, 50A. For example, the motor shaft may be disposed in the front-rear direction, the drive shaft of the abrading part may be disposed in the up-down direction, and the rotational power of the motor may be transmitted to the drive shaft of the abrading part by a well-known transmission mechanism.

The embodiments described above are applicable to other portable abrading machines configured such that the abrading part moves with orbital motion. For example, they are also applicable to polishers, and the like.

The present disclosure is not limited to the embodiments described above and can be implemented by a variety of configurations within a range that does not depart from the gist thereof. For example, to solve some or all of the problems described above or to achieve some or all of the effects described above, the technical features of the embodiments corresponding to the technical features in the embodiments described in the Summary section above can be substituted or combined as appropriate. In addition, unless a technical feature is explained as being essential in the present specification, it may be eliminated as appropriate.

EXPLANATION OF THE REFERENCE NUMBERS

1, 1A, 1B, 1C Sanders
10, 10A, 10B Sander main bodies
20 Housing
21 Main-body housing
22 Intermediate part
23 Upper-end part
24 Lower-end part
25 Main grip part
30 Handle part
31 First end part
32 Second end part
34 Tilted wall
35 Controller-housing part
36 Adapter-housing part
38 Through hole
39 Dust-collecting nozzle
40 Motor
41 Motor main body
42 Motor shaft
44, 45, 48 Bearings
46 Bolt
47 Fan
49 Bearing box
49A Bearing box
50 Abrading part
50A Abrading part
51 Abrading pad
51A Abrading pad
53 Second connector
54 Terminal part
55 Tube wall
56 Bolt
60 Controller
61 Wireless-communication adapter
65 Switch
70 Power-supply cord
70B Power-supply cord
71 First connector
72 One end
73 Cord main body
73B Cord main body
74 Terminal part
75 Engaging part
76 Cover
80, 80B, 80C Battery holsters
81, 81B Battery-holster, main-body parts
81C Mounting part
85 Battery-mounting part
86 Hook
87 Battery-holster-side connection part
101 Battery
105 Dust-collecting pack
481A, 482A Bearings
200 Cleaner
201 Hose
205 Band
81C Mounting part
A1 Rotational axis
A2 Axis
A3 Tangent
P1 First virtual plane
P2 Second virtual plane
P3 Third virtual plane
P4 Fourth virtual plane
P5 Fifth virtual plane
R1 Angle formed between the first virtual plane and the axis of the cover
R2 Angle formed between the first virtual plane (third virtual plane) and the upper surface of the dust-collecting pack
R3 Angle formed between axis A2 and tangent A3
R4 Angle formed between the first virtual plane and the second virtual plane
C1 Balance point
C2 Center point of the dust-collecting pack in the front-rear direction
C3 Center point of the controller in the front-rear direction
L1 Overall length of the dust-collecting pack
L2 Overlap length of the cover relative to the dust-collecting pack
L3 Overall length of the sander main body
L4 Distance from balance point C1 to center point C2
L5 Distance from balance point C1 to rotational axis A1
L6 Distance from balance point C1 to center point C3

The invention claimed is:

1. A portable abrading machine comprising:
a motor having a motor shaft;
an abrading-machine main body comprising a main-body housing, which houses the motor, an abrading pad configured to move with orbital motion in response to rotation of the motor shaft, and a dust-collecting nozzle;
a battery holster comprising a battery-mounting part configured to mount a detachable battery; and
a power-supply cord configured to supply electric power from the battery-mounting part to the abrading-machine main body and connecting the abrading-machine main body to the battery holster without going through the main-body housing, wherein:

the power-supply cord comprises a first connector in the form of a plug;

the abrading-machine main body comprises a second connector in the form of a socket configured to receive the first connector to electrically connect to the first connector and conduct electric current from the battery-mounting part to the motor;

the first connector is configured to be detachably inserted into the second connector;

a rear-end part of the dust-collecting nozzle is configured to mount a dust-collection container in a detachable manner;

the power-supply cord is configured such that the power-supply cord does not make contact with the dust-collection container in a first state of the portable abrading machine, in which: (i) the dust-collection container is mounted on the dust-collecting nozzle; (ii) the abrading pad is placed on a level surface; (iii) the battery holster and the abrading-machine main body are connected by the power-supply cord; and (iv) the battery holster is disposed directly rearward of a rear end of the dust-collection container and below the level surface but such that the intrinsic weight of the battery holster is not applied to the power-supply cord.

2. The portable abrading machine according to claim 1, wherein:

a rotational axis of the motor shaft extends in the up-down direction, and the abrading pad is located on a lower side relative to the main-body housing;

an upper-end part of the main-body housing is configured as a main grip part, which is grippable by a user; and when the main grip part and the motor are viewed in the up-down direction from upward of the main grip part, the main grip part is disposed overlapping the motor such that an outer edge of the main grip part surrounds an outer edge of the motor.

3. The portable abrading machine according to claim 2, wherein the abrading-machine main body further comprises an auxiliary grip part connected to the main grip part and extending in a direction that intersects the rotational axis.

4. The portable abrading machine according to claim 3, wherein:

the dust-collecting nozzle is disposed downward of the auxiliary grip part in the up-down direction and is configured to discharge dust generated by the abrading pad while abrading a work material; and when the auxiliary grip part and the dust-collecting nozzle are viewed in the up-down direction from upward of the auxiliary grip part, the dust-collecting nozzle is disposed overlapping the auxiliary grip part.

5. The portable abrading machine according to claim 3, wherein the second connector is provided on an end portion of the auxiliary grip part that is on a side of the auxiliary grip part that is farthest from the main grip part.

6. The portable abrading machine according to claim 5, wherein:

the dust-collecting nozzle is disposed downward of the auxiliary grip part in the up-down direction and is configured to discharge dust generated by the abrading pad while abrading a work material;

when the auxiliary grip part and the dust-collecting nozzle are viewed in the up-down direction from upward of the auxiliary grip part, the dust-collecting nozzle is disposed overlapping the auxiliary grip part; and when the extension directions of the auxiliary grip part are oriented in a front-rear direction of the portable abrading machine, the side of the auxiliary grip part that connects with the main grip part is defined as the front side, and the side opposite thereof is defined as the rear side.

7. The portable abrading machine according to claim 6, wherein, in the first state:

a connecting portion of the battery holster that connects with the power-supply cord faces upward; and the battery holster is disposed upward of a lower-end position of the power-supply cord when the power-supply cord is extended downward.

8. The portable abrading machine according to claim 6, wherein the power-supply cord comprises a cord main body, which is configured to conduct current between the battery and the abrading-machine main body, and a cover, which extends rearward from the first connector and covers a portion of the cord main body.

9. The portable abrading machine according to claim 8, wherein the cover is less flexible than the cord main body.

10. The portable abrading machine according to claim 8, wherein, when the dust-collection container is mounted on the rear-end part of the dust-collecting nozzle, the cover is located upward of the dust-collection container and overlaps at least 30% the dust-collection container in the front-rear direction.

11. The portable abrading machine according to claim 8, wherein the cover is configured such that, when the portable abrading machine is in the first state, a first virtual plane, which contains the level surface, and an axis, which extends along a longitudinal center of the cover, intersect each other, and the cover extends rearward and upward of the first connector.

12. The portable abrading machine according to claim 8, wherein the cover is configured such that, when the portable abrading machine is in the first state, an angle formed between a first virtual plane, which contains the level surface, and a second virtual plane, which passes through a rear end of the abrading pad and makes contact with a lower end of the dust-collection container, is 5° or more and 15° or less.

13. The portable abrading machine according to claim 8, wherein the power-supply cord is configured such that, when the portable abrading machine is in the first state, an angle formed between a tangent line and an axis, which extends along a longitudinal center of the cover, is 55° or more and 90° or less, wherein the tangent line intersects a point of intersection of a first virtual plane, which contains the level surface, and the cord main body, and extends in the same direction as a curve of a portion of the cord main body at the point of intersection N1.

14. The portable abrading machine according to claim 8, wherein:

when the portable abrading machine is in the first state, the cord main body intersects a first virtual plane, which contains the level surface, at a first location that is rearward of the abrading-machine main body; and the first location is located forward of a second location that spaced rearward from a rear end of the abrading-machine body by a distance that is equal to the length of the abrading-machine main body in the front-rear direction.

15. The portable abrading machine according to claim 6, wherein:

the abrading-machine main body is configured such that, when the dust-collection container is mounted on the rear-end part, the mass of the abrading-machine main body in the front-rear direction is balanced at a balance point; and the balance point is in/on the auxiliary grip part.

16. The portable abrading machine according to claim 15, wherein the abrading-machine main body is configured such that the distance between an intermediate point of the length of the dust-collection container in the front-rear direction and the balance point is 0.150 m or more and 0.200 m or less.

17. The portable abrading machine according to claim 15, wherein the abrading-machine main body is configured such that the distance between the rotational axis of the motor shaft and the balance point is 0.040 m or more and 0.100 m or less.

18. The portable abrading machine according to claim 15, wherein the portable abrading machine is configured such that the mass moment of the portion from the balance point to the rotational axis of the motor shaft is 0.20 N·m or more and 0.50 N·m or less.

19. The portable abrading machine according to claim 8, wherein:

the battery holster comprises a hook; and the length of the cord main body is 0.80 m or more and 2.0 m or less.

20. The portable abrading machine according to claim 8, wherein:

the rear-end part of the dust-collecting nozzle is configured to be detachable from a hose that is connected to a suction apparatus configured to suction dust;

the battery holster further comprises a suction apparatus mounting part configured to detachably mount the suction apparatus; and the length of the cord main body is 2.0 m or more and 6.0 m or less.

21. The portable abrading machine according to claim 7, wherein the portable abrading machine further comprises the dust-collection container.

22. The portable abrading machine according to claim 1, wherein the abrading-machine main body further comprises a controller configured to control rotation of the motor shaft.

23. The portable abrading machine according to claim 22, wherein:

the second connector is provided on an end portion of the auxiliary grip part that is on a side of an auxiliary grip part that is farthest from a main grip part; and the controller is disposed between the auxiliary grip part and the dust-collecting nozzle in the up-down direction.

24. The portable abrading machine according to claim 1, wherein the battery holster comprises a controller configured to control rotation of the motor shaft.

25. The portable abrading machine according to claim 1, wherein the battery holster comprises the battery, which is mounted on the battery-mounting part.

26. The portable abrading machine according to claim 1, wherein:

the second connector comprises a plurality of pins surrounded by a tube wall, the pins being electrically connected to the motor;

the first connector comprises a tubular-shaped engaging part provided around a terminal part and configured to be fitted onto the tube wall; and the terminal part is electrically connected to power supply lines of the power cord and is configured to be electrically connectable to the plurality of pins in a detachable manner.

* * * * *